US011959433B2

(12) United States Patent
Gujar et al.

(10) Patent No.: US 11,959,433 B2
(45) Date of Patent: Apr. 16, 2024

(54) SYSTEMS AND METHODS FOR DETERMINING EXHIBITED USEFUL LIFE OF SENSORS IN MONITORED SYSTEMS

(71) Applicant: Cummins Emission Solutions Inc., Columbus, IN (US)

(72) Inventors: Swapnali Gujar, Bargersville, IN (US); Kapil Rajkumar Dhanwani, Columbus, IN (US); Kwadwo O. Owusu, Greenwood, IN (US); Premjee Sasidharan, Columbus, IN (US); Alan H. Zhao, Columbus, IN (US); Jinqian Gong, Columbus, IN (US); Jeffrey Diwakar Abraham, Columbus, IN (US); Thomas C. Smith, Jr., Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 17/868,205

(22) Filed: Jul. 19, 2022

(65) Prior Publication Data
US 2024/0026836 A1 Jan. 25, 2024

(51) Int. Cl.
*F02D 41/22* (2006.01)
*F02D 41/14* (2006.01)
(Continued)

(52) U.S. Cl.
CPC ....... *F02D 41/222* (2013.01); *F02D 41/1401* (2013.01); *F02D 41/1454* (2013.01);
(Continued)

(58) Field of Classification Search
CPC ............. F02D 41/222; F02D 41/1401; F02D 41/1454; F02D 41/1461; F02D 41/2474;
(Continued)

(56) References Cited

U.S. PATENT DOCUMENTS

| 5,157,610 | A | * | 10/1992 | Asano | ................. G07C 5/008 |
| | | | | | 73/114.61 |
| 6,096,186 | A | * | 8/2000 | Warburton | ........... G01N 27/404 |
| | | | | | 73/1.06 |

(Continued)

FOREIGN PATENT DOCUMENTS

WO    WO-2021/183322 A1    9/2021

OTHER PUBLICATIONS

Thomas McKinley et al; "Identifying NOx Sensor Failure for Predictive Maintenance of Diesel Engines Using Explainable AI", European Conference of the Prognostics and Health Management Society 2020; Jul. 20, 2020.

(Continued)

*Primary Examiner* — Sizo B Vilakazi
*Assistant Examiner* — Brian R Kirby
(74) *Attorney, Agent, or Firm* — Foley & Lardner LLP

(57) ABSTRACT

At least one server comprising at least one processor coupled to at least one memory storing instructions. The server can receive a first signal from a first monitored system comprising an internal combustion engine and a first sensor, the first signal associated with a first occurrence of an internal combustion engine event, a second occurrence of the internal combustion engine event, and first measurement data of the first sensor. The server can determine a first measurement from the first measurement data. The server can determine a second measurement from the first measurement data. The server can determine a measurement deviation between the first measurement and the second measurement. The server can compare the measurement deviation to a stored measurement threshold. The server can determine a first exhibited useful life of the first sensor based on the measurement deviation and at least one of the first measurement or the second measurement.

21 Claims, 12 Drawing Sheets

(51) Int. Cl.
*F02D 41/24* (2006.01)
*G05B 23/02* (2006.01)

(52) U.S. Cl.
CPC ..... *F02D 41/1461* (2013.01); *F02D 41/2474* (2013.01); *G05B 23/0283* (2013.01); *F02D 2041/1433* (2013.01)

(58) Field of Classification Search
CPC ....... F02D 2041/1433; G05B 23/0283; G01M 15/14; G01M 15/102; G01M 15/00
USPC ............... 701/29.7, 29.3, 29.8, 29.9, 30, 31; 702/183, 188, 181, 185
See application file for complete search history.

(56) References Cited

U.S. PATENT DOCUMENTS

| | | | | |
|---|---|---|---|---|
| 6,453,663 | B1* | 9/2002 | Orzel | F02D 41/1495 123/690 |
| 6,745,153 | B2* | 6/2004 | White | B60R 16/0215 702/182 |
| 7,103,460 | B1* | 9/2006 | Breed | G07C 5/008 706/15 |
| 8,091,416 | B2 | 1/2012 | Wang et al. | |
| 8,245,567 | B2 | 8/2012 | Wang et al. | |
| 8,370,017 | B2* | 2/2013 | Weber | F02D 41/064 123/295 |
| 8,726,723 | B2 | 5/2014 | Clerc et al. | |
| 8,788,184 | B2* | 7/2014 | Baumann | F01N 11/00 123/697 |
| 8,863,497 | B1 | 10/2014 | Legare | |
| 8,955,309 | B2 | 2/2015 | Yacoub | |
| 9,297,286 | B2 | 3/2016 | Kruer et al. | |
| 9,909,517 | B2 | 3/2018 | Kothandaraman et al. | |
| 10,026,241 | B1 | 7/2018 | Sankavaram et al. | |
| 10,113,464 | B2 | 10/2018 | David et al. | |
| 10,253,734 | B2 | 4/2019 | Jammoussi et al. | |
| 10,620,174 | B2* | 4/2020 | Jackson | G01N 33/0073 |
| 2002/0161495 | A1* | 10/2002 | Yamaki | G07C 5/008 701/33.8 |
| 2003/0225503 | A1* | 12/2003 | Mazur | F02M 26/46 123/690 |
| 2006/0212193 | A1* | 9/2006 | Breed | B60C 23/0425 701/33.7 |
| 2007/0043486 | A1* | 2/2007 | Moffett | B61K 9/12 701/19 |
| 2009/0248239 | A1* | 10/2009 | Iwaki | B60W 50/02 701/32.7 |
| 2010/0031633 | A1* | 2/2010 | Kitazawa | F02D 41/146 73/23.31 |
| 2010/0095933 | A1* | 4/2010 | Moriya | F02D 41/222 123/703 |
| 2011/0118905 | A1* | 5/2011 | Mylaraswamy | G07C 5/085 702/183 |
| 2011/0146240 | A1* | 6/2011 | Wilhelm | F01N 3/208 60/287 |
| 2012/0255277 | A1* | 10/2012 | Rajagopalan | F02D 41/222 60/274 |
| 2012/0283963 | A1* | 11/2012 | Mitchell | F01D 21/003 702/34 |
| 2012/0303206 | A1* | 11/2012 | Rajagopalan | F02D 41/222 701/32.1 |
| 2013/0066512 | A1* | 3/2013 | Willard | G07C 5/0808 701/29.1 |
| 2013/0133309 | A1* | 5/2013 | Zimmerman | F01N 3/208 60/274 |
| 2013/0184929 | A1* | 7/2013 | Salman | G05B 23/0283 701/31.4 |
| 2013/0338900 | A1* | 12/2013 | Ardanese | F02D 41/1465 701/102 |
| 2015/0178997 | A1* | 6/2015 | Ohsaki | G07C 5/00 701/29.1 |
| 2015/0371465 | A1* | 12/2015 | Garrett | G06F 16/335 701/29.1 |
| 2016/0209383 | A1* | 7/2016 | Gong | F01N 3/2066 |
| 2016/0279574 | A1 | 9/2016 | Devarakonda | |
| 2017/0242688 | A1 | 8/2017 | Yu et al. | |
| 2018/0058361 | A1* | 3/2018 | Di Miro | F01N 11/007 |
| 2018/0101639 | A1 | 4/2018 | Nanda et al. | |
| 2019/0066397 | A1* | 2/2019 | Du | G07C 5/008 |
| 2019/0093535 | A1 | 3/2019 | Devarakonda et al. | |
| 2019/0093540 | A1 | 3/2019 | Devarakonda et al. | |
| 2019/0244442 | A1* | 8/2019 | Kyes | G07C 5/006 |
| 2019/0384257 | A1* | 12/2019 | Zhang | G06F 11/008 |
| 2020/0065690 | A1* | 2/2020 | Neri | G06N 3/084 |
| 2020/0354086 | A1* | 11/2020 | Wang | G07C 5/006 |
| 2023/0003152 | A1 | 1/2023 | Clerc et al. | |
| 2023/0028415 | A1 | 1/2023 | Meier et al. | |

OTHER PUBLICATIONS

International Search Report-Written Opinion on PCT/US2023/021834 dated Aug. 4, 2023.

Notice of Allowance in U.S. Appl. No. 17/876,863, dated Apr. 18, 2023.

* cited by examiner

SYSTEMS AND METHODS FOR DETERMINING EXHIBITED USEFUL LIFE OF SENSORS IN MONITORED SYSTEMS

TECHNICAL FIELD

The present application relates generally to systems and methods for determining exhibited useful life of sensors in monitored systems.

BACKGROUND

Internal combustion engines, such as diesel engines, emit exhaust that includes nitrogen oxide ($NO_x$) compounds. It may be desirable to reduce $NO_x$ emissions, for example, to comply with environmental regulations. To reduce $NO_x$ emissions, a reductant may be dosed into the exhaust by a dosing system in an aftertreatment system. The reductant cooperates with a catalyst to facilitate conversion of a portion of the exhaust into non-$NO_x$ emissions, such as nitrogen ($N_2$), carbon dioxide ($CO_2$), and water ($H_2O$), thereby reducing $NO_x$ emissions.

In some applications, these compounds of the exhaust gas can be sensed by one or more sensors located in the aftertreatment system. In such applications, it is desirable to maintain the operability and condition of the sensor(s) to ensure reliable measurement results. Typically, the condition or performance of the sensor(s) may be evaluated during routine maintenance of certain systems. In some cases, a fault code or an indication of sensor failure is provided to the operator after the sensor has already failed. However, it can be challenging to predict the remaining lifetime of the sensor before failure.

SUMMARY

In some embodiments, at least one server can include at least one processor coupled to at least one memory storing instructions that, when executed by the at least one processor, cause the at least one server to receive a first signal from a first monitored system that comprises an internal combustion engine and a first sensor, the first signal associated with a first occurrence of an internal combustion engine event of the first monitored system, a second occurrence of the internal combustion engine event of the first monitored system, and first measurement data of the first sensor. The server can determine a first measurement from the first measurement data based on the first occurrence of the internal combustion engine event. The server can determine a second measurement from the first measurement data based on the second occurrence of the internal combustion engine event. The server can determine a measurement deviation between the first measurement and the second measurement. The server can compare the measurement deviation to a stored measurement threshold. The server can determine, after determining that the measurement deviation satisfies the measurement threshold, a first exhibited useful life of the first sensor based on the measurement deviation and at least one of the first measurement or the second measurement.

In certain embodiments, a method can include receiving, by at least one server, a first signal from a monitored system, the first signal associated with a first occurrence of an internal combustion engine event of the monitored system, a second occurrence of the internal combustion engine event of the monitored system, and first measurement data of a first sensor of the monitored system. The method can include determining, by the at least one server, a first measurement from the first measurement data based on the first occurrence of the internal combustion engine event. The method can include determining, by the at least one server, a second measurement from the first measurement data based on the second occurrence of the internal combustion engine event. The method can include determining, by the at least one server, a measurement deviation between the first measurement and the second measurement. The method can include comparing, by the at least one server, the measurement deviation to a measurement threshold. The method can include determining, by the at least one server, after determining that the measurement deviation satisfies the measurement threshold, a first exhibited useful life of the first sensor based on the measurement deviation and at least one of the first measurement or the second measurement.

In yet other embodiments, a network can include a first monitored system comprising a first internal combustion engine, a first sensor, and a first engine control unit. The network can include at least one server external to the first monitored system, the at least one server comprising at least one processor coupled to at least one memory storing instructions that, when executed by the at least one processor, cause the at least one server to receive a first signal from the first engine control unit, the first signal associated with a first occurrence of a first internal combustion engine event of the first monitored system, a second occurrence of the first internal combustion engine event, and first measurement data of the first sensor. The server can determine a first measurement from the first measurement data based on the first occurrence of the first internal combustion engine event. The server can determine a second measurement from the first measurement data based on the second occurrence of the first internal combustion engine event. The server can determine a first measurement deviation between the first measurement and the second measurement. The server can compare the first measurement deviation to a stored measurement threshold. The server can determine, after determining that the first measurement deviation satisfies the measurement threshold, a first exhibited useful life of the first sensor based on the first measurement deviation and at least one of the first measurement or the second measurement.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
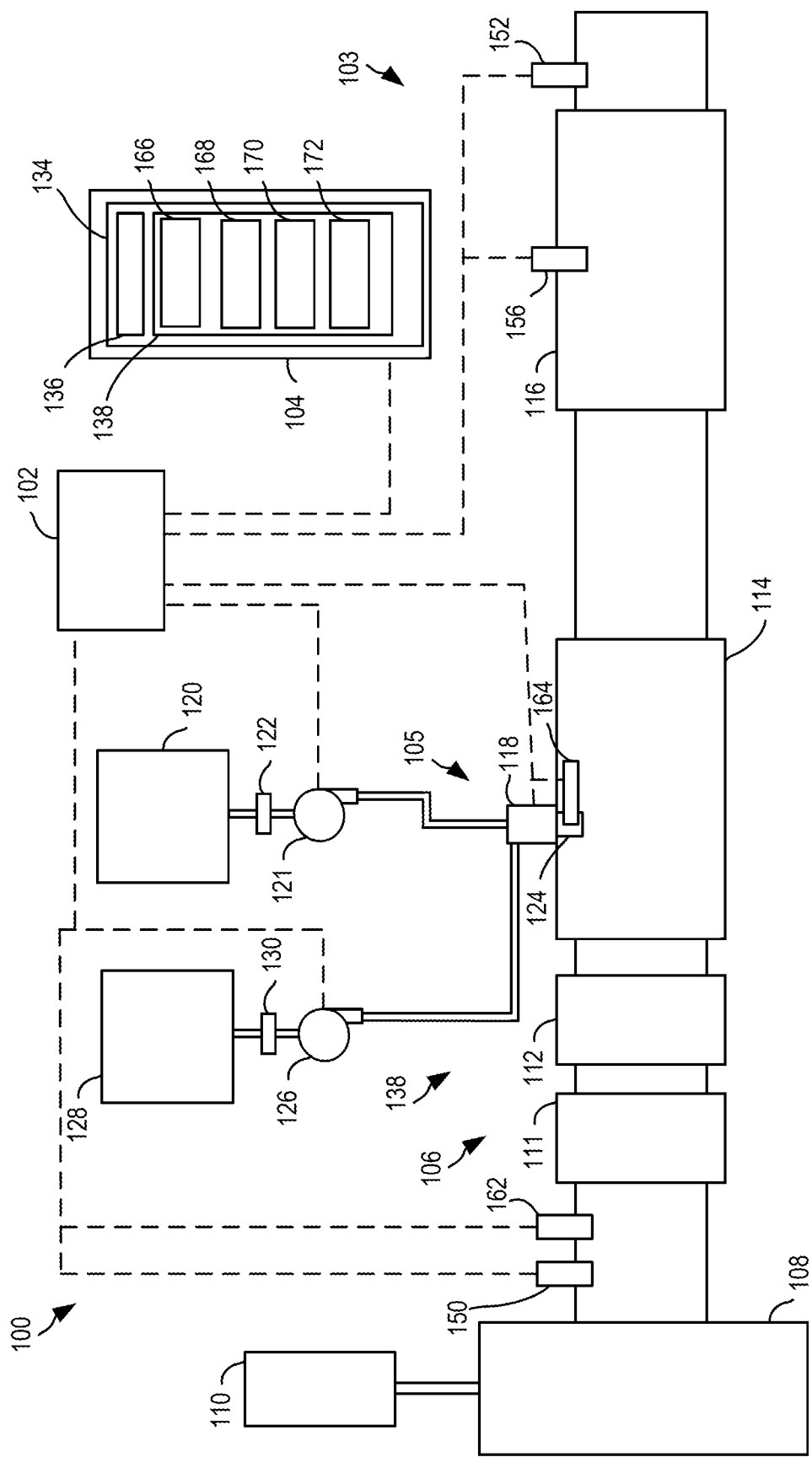
FIG. 1 is a block schematic diagram of an example vehicle system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and for determining exhibited useful life of sensors in monitored systems. The various concepts introduced above and discussed in greater detail below may be implemented in any of a number of ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust gas. Depending on the fuel consumed by an internal combustion engine, the exhaust gas can contain different byproducts (e.g., $NO_x$, carbon monoxide (CO), unburned hydrocarbons (HC), etc.). The byproduct of the exhaust gas can be measured or sensed by one or more sensors of the aftertreatment system, for instance, measuring the density, volume, parts per million (ppm), etc. of the exhaust gas. For simplicity, the examples herein can provide $NO_x$ as the byproducts of the exhaust gas and the sensor can be a $NO_x$ sensor structured to sense $NO_x$ emission downstream of the engine (e.g., at any position along the exhaust pipe). Although the described examples include a $NO_x$ sensor measuring a $NO_x$ byproduct, the described systems can be applied to other sensors.

The measurement can be used by a controller to control or manage component(s) within or coupled to the aftertreatment to manage emissions from the engine. For example, the component(s) can include a reductant doser, hydrocarbon injector, exhaust gas recirculation (EGR) system, heater, cooler, among other components. Using the measurement results, the controller can control one or more components to minimize $NO_x$ slippage, for instance, increasing reductant dosage, initiating hydrocarbon injection for catalyst (e.g., selective catalytic reduction (SCR) catalyst, etc.) regeneration, etc. However, due to the degradation or malfunction of sensors over time, the controller may receive inaccurate measurements, or in some cases, may not receive any signals from the sensors. The inaccuracy of the measurement or lack of signals indicating the emission output from the engine may compromise the operability of certain component(s) coupled to or of the aftertreatment system, which results in an erroneous adjustment or configuration of the controller. Therefore, it is desired to determine or predict the health of the sensor over time to subsequently maintain or replace the sensor prior to failure (e.g., predict a duration till failure).

The systems and methods of the technical solution described herein include at least one device (e.g., computing device, server, or data processing system) including at least one processor coupled to at least one memory. In some cases, the device can be embedded into a system including the internal combustion engine and the one or more sensors. In some cases, the device may correspond to or be referred to as a server herein. The server can be a remote device configured to receive signals, data, or information from one or more sensors downstream of the engine (e.g., internal combustion engine). The server can receive and monitor the signals from the sensor, such as the measurement data (e.g., first measurement data) of the sensor during prespecified/predetermined combustion engine events or operational events. These combustion engine events can include expected behavior (e.g., expected measurement or second measurement data) from the sensor, which can be used to determine its exception from the expected behavior (e.g., measurement deviation between the first measurement and the second measurement).

The server can use the amalgamation of data analytics and physics-based techniques described herein to provide a prognostic solution to the health prediction of the sensor, among other components of the aftertreatment system. The health prediction can include an exhibited or predicted useful life of the sensors, actuators, filters, among other components in the engine system under observation. By predicting the health, the server can notify the client or user for early replacement or maintenance of the sensors. Further, to predict the health or condition of the sensor, the server can generate, obtain, or train a machine learning model using specific measurement results over time without relying on population data (e.g., information from other internal combustion engine systems). For example, instead of comparing the behaviors of the sensor to other comparable sensors (e.g., sensors belonging to similar vehicles, machines, etc.), the server can aggregate sensor measurements (e.g., first measurement, second measurement, etc.) during occurrences of the predetermined engine event to determine changes in the offsets to the measurements of the sensor. The offsets (e.g., calibration) may be applied to the sensor due to a reduction in sensitivity, among other variables affecting the sensor's ability to accurately measure $NO_x$ emission.

The server can train the model by inputting data of the offsets measured during the engine event. The model can aggregate the input data, including the changes, deviations, and fluctuations of the offsets from the installation time to the failure time of the sensors. The server can provide the model with sample data to improve the performance of the model (e.g., output accuracy). Once trained and executable based on having at least a desired performance, the server can use the model to subsequently predict the health (e.g., remaining useful life or time till failure) of one or more sensors (e.g., a similar type of sensor associated with the trained model). For example, the server can receive sensor data from a sensor and input the sensor data into the model. The model can determine, based on at least one of the fluctuations, deviations, or the trend of the offset measurement, the remaining useful life or failure time of the sensor according to the operating condition/environment (e.g., lifetime/age, operating temperature, exhaust gas exposure, poisoning, duty cycle, fuel quality, etc.) experienced by the sensor during its operation. Accordingly, the server can predict the remaining operational time of the sensor without high resource consumption (e.g., without comparing to various population data) and extended latency for prediction output.

Through these features, implementations described herein are capable of alerting a user as to the use of impure fuel and the aging of a catalyst beyond a desirable amount. As a result, implementations described herein are capable of reducing costs associated with warranty servicing and/or replacements which may be performed when impure fuel is consumed by an internal combustion engine.

II. Overview of Network System

FIG. 1 illustrates an example network system 100 (e.g., network). The network system 100 includes a monitored system 102 and a monitoring system 104 (e.g., server). The monitored system 102 communicates with the monitoring system 104 (e.g., electrical or wireless communication). The monitored system 102 can include or be a part of a vehicle (e.g., in communication with the vehicle). The vehicle may be an on-road or an off-road vehicle including, but not limited to, line-haul trucks, mid-range trucks (e.g., pick-up trucks), cars, boats, tanks, airplanes, locomotives, mining equipment, and any other type of vehicle. The vehicle may include a transmission, a fueling system, one or more additional vehicle subsystems, etc. The vehicle may include additional, less, and/or different components/systems, such that the principles, methods, systems, apparatuses, processes, and the like of the present disclosure are intended to be applicable with any other vehicle configuration. It should also be understood that the principles of the present disclosure should not be interpreted to be limited to vehicles; rather, the present disclosure is also applicable with stationary pieces of equipment such as a power generator or genset.

The monitored system 102 includes an exhaust gas aftertreatment system 103 having a reductant delivery system 105 for an exhaust gas conduit system 106. The monitored system 102 also includes an internal combustion engine 108 (e.g., diesel internal combustion engine, diesel hybrid internal combustion engine, gasoline internal combustion engine, petrol internal combustion engine, liquid propane internal combustion engine, etc.) which produces exhaust gas that is received by the exhaust gas aftertreatment system 103. The internal combustion engine 108 receives fuel (e.g., diesel fuel, gasoline, liquid propane, etc.) from a fuel tank 110 (e.g., reservoir, etc.). The fuel tank 110 is configured to be replenished (e.g., by a user, etc.).

The exhaust gas aftertreatment system 103 also includes an oxidation catalyst 111 (e.g., a diesel oxidation catalyst (DOC)). The oxidation catalyst 111 is configured to (e.g., structured to, able to, etc.) promote oxidation of hydrocarbons and/or carbon monoxide in exhaust gas produced by the internal combustion engine 108 and flowing in the exhaust gas conduit system 106.

The exhaust gas aftertreatment system 103 also includes a particulate filter 112 (e.g., a diesel particulate filter (DPF), etc.). The particulate filter 112 is configured to remove particulate matter, such as soot, from the exhaust gas provided by the oxidation catalyst 111. The particulate filter 112 includes an inlet, where the exhaust gas is received, and an outlet, where the exhaust gas exits after having particulate matter substantially filtered from the exhaust gas and/or converting the particulate matter into carbon dioxide. In some implementations, the particulate filter 112 may be omitted.

The exhaust gas aftertreatment system 103 also includes a decomposition chamber 114 (e.g., reactor, reactor pipe, etc.). The decomposition chamber 114 is configured to convert a reductant into ammonia. The reductant may be, for example, urea, diesel exhaust fluid (DEF), Adblue®, a urea water solution (UWS), an aqueous urea solution (AUS) (e.g., AUS32, etc.), and other similar fluids. The decomposition chamber 114 includes an inlet in fluid communication with the particulate filter 112 to receive the exhaust gas containing $NO_x$ emissions and an outlet for the exhaust gas, $NO_x$ emissions, ammonia, and/or reductant to flow from the decomposition chamber 114.

The exhaust gas aftertreatment system 103 also includes a conversion catalyst 116 (e.g., a selective catalytic reduction (SCR) catalyst, a copper-zeolite SCR catalyst, etc.). The conversion catalyst 116 is configured to assist in the reduction of $NO_x$ emissions by accelerating a $NO_x$ reduction process between the ammonia and the $NO_x$ of the exhaust gas into diatomic nitrogen, water, and/or carbon dioxide. The conversion catalyst 116 includes an inlet in fluid communication with the decomposition chamber 114 from which exhaust gas and reductant are received and an outlet in fluid communication with an end of the exhaust gas conduit system 106.

The decomposition chamber 114 is located upstream of the conversion catalyst 116. As a result, the reductant is injected upstream of the conversion catalyst 116 such that the conversion catalyst 116 receives a mixture of the reductant and exhaust gas. The reductant droplets undergo the processes of evaporation, thermolysis, and hydrolysis to form non-$NO_x$ emissions (e.g., gaseous ammonia, etc.) within the exhaust gas conduit system 106.

The reductant delivery system 105 includes a dosing module 118 (e.g., doser, etc.) configured to dose the reductant into the decomposition chamber 114 (e.g., via an injector, etc.). The dosing module 118 is mounted to the decomposition chamber 114 such that the dosing module 118 may dose the reductant into the exhaust gas flowing in the exhaust gas conduit system 106. The dosing module 118 may include an insulator (e.g., thermal insulator, etc.) and/or isolator (e.g., vibrational isolator, etc.) interposed between a portion of the dosing module 118 and the portion of the decomposition chamber 114 on which the dosing module 118 is mounted.

The dosing module 118 is fluidly coupled to (e.g., fluidly configured to communicate with, etc.) a reductant source 120 (e.g., reductant tank, reductant reservoir, etc.). The reductant source 120 may include multiple reductant sources 120. The reductant source 120 may be, for example, a DEF tank containing Adblue©. A reductant pump 121 (e.g., supply unit, etc.) is used to pressurize the reductant from the reductant source 120 for delivery to the dosing module 118. In some embodiments, the reductant pump 121 is pressure controlled (e.g., controlled to obtain a target pressure, etc.). The reductant pump 121 may draw the reductant through a reductant filter 122. The reductant filter 122 filters (e.g., strains, etc.) the reductant prior to the reductant being provided to internal components (e.g., pistons, vanes, etc.) of the reductant pump 121. For example, the reductant filter 122 may inhibit or prevent the transmission of solids (e.g., solidified reductant, contaminants, etc.) to the internal components of the reductant pump 121. In this way, the reductant filter 122 may facilitate prolonged desirable operation of the reductant pump 121. In some embodiments, the reductant pump 121 is coupled to a chassis of a vehicle associated with the exhaust gas aftertreatment system 103.

The dosing module 118 includes at least one injector 124 (e.g., reductant injector, etc.). Each injector 124 is configured to dose the reductant into the exhaust gas (e.g., within the decomposition chamber 114, etc.). The injector 124 may be positioned to cause the reductant to achieve a target uniformity index (UI) within the exhaust gas at a target location (e.g., at an inlet of the conversion catalyst 116, etc.).

In some embodiments, the reductant delivery system 105 also includes an air pump 126. In these embodiments, the air pump 126 draws air from an air source 128 (e.g., air intake, atmosphere, etc.) and through an air filter 130 disposed upstream of the air pump 126. The air filter 130 filters the air prior to the air being provided to internal components (e.g., pistons, vanes, etc.) of the air pump 126. For example, the air filter 130 may inhibit or prevent the transmission of solids (e.g., debris, branches, dirt, etc.) to the internal components of the air pump 126. In this way, the air filter 130 may facilitate prolonged desirable operation of the air pump 126. The air pump 126 provides the air to the dosing module 118 via a conduit. The dosing module 118 is configured to mix the air and the reductant into an air-reductant mixture and to provide the air-reductant mixture into the decomposition chamber 114. In other embodiments, the reductant delivery system 105 does not include the air pump 126 or the air source 128. In such embodiments, the dosing module 118 is not configured to mix the reductant with air.

The dosing module 118 and the reductant pump 121 (among other components of the network system 100) are also electrically or communicatively coupled to a monitored system 102 (e.g., exhaust gas aftertreatment system controller or engine control unit (ECU)). The monitored system 102 is configured to control the dosing module 118 to dose the reductant into the decomposition chamber 114. The monitored system 102 may also be configured to control the reductant pump 121.

The monitored system 102 is electrically or communicatively coupled to the engine 108 and one or more components of the aftertreatment system 103. The monitored system 102 is configured to control the engine 108, such as the valve timing, crankshaft rotation rate, etc. The monitored system 102 is configured to control one or more components of the aftertreatment system 103, such as a reductant doser, hydrocarbon injector, sensor calibration (e.g., applying or providing offsets to the sensor measurement based on the changes to the sensor sensitivity), etc. The monitored system 102 can be in electrically communication to other components of the network system 100.

In various embodiments, the monitored system 102 is electrically or communicatively coupled to the monitoring system 104. In some cases, the monitoring system 104 can be another controller or component electrically coupled to the monitored system 102. In various cases, the monitoring system 104 communicates remotely to the monitored system 102, among one or more other components (e.g., the various modules, the sensors, etc.) of the network system 100. For instance, the monitoring system 104 can communicate with the one or more components via wired or wireless communication (e.g., Bluetooth, LTE, Wi-Fi, broadcast radio, satellite, etc.). For example, the monitoring system 104 can be a server, data processing system, or remote device configured to receive data from the components of the network system 100, such as from the monitored system 102.

The monitoring system 104 includes a processing circuit 134. The processing circuit 134 includes a processor 136 and a memory 138. The processor 136 may include a microprocessor, an application-specific integrated circuit (ASIC), a field-programmable gate array (FPGA), etc., or combinations thereof. The memory 138 may include, but is not limited to, electronic, optical, magnetic, or any other storage or transmission device capable of providing a processor, ASIC, FPGA, etc. with program instructions. This memory 138 may include a memory chip, Electrically Erasable Programmable Read-Only Memory (EEPROM), Erasable Programmable Read Only Memory (EPROM), flash memory, or any other suitable memory from which the monitoring system 104 can read instructions. The instructions may include code from any suitable programming language. The memory 138 may include various modules that include instructions which are configured to be implemented by the processor 136.

In some cases, the monitored system 102 is configured to communicate with the monitoring system 104. For example, the monitored system 102 is configured to transmit information from the component(s) of the monitored system 102 (e.g., aftertreatment system 103, engine 108, etc.) to the monitoring system 104 for storage or processing. The information can include sensor measurement, timestamps associated with the measurement, indications of various engine operations/events (e.g., motoring event, ignition, levels of fuel injection, speed of the crankshaft rotation speed, etc.), timestamps associated with the engine operations, among other data described herein. In another example, the monitored system 102 is configured to receive or obtain instructions or processed information from the monitoring system 104. The instruction can include displaying the processed information to the operator via a display device, for example. The processed information can include at least the operating time, the remaining useful life (e.g., operational duration), and failure time (e.g., remaining time until failure) of the component (e.g., sensor). The monitored system 102 can receive other data or instructions from the monitoring system 104, for example, to control the component(s) of the network system 100 or provide information to the operator, such as visual, audio, or haptic feedback.

While not shown, it is understood that the internal combustion engine 108 includes various components, such as cylinders, pistons, fuel injectors, air intakes, and other similar components. In some applications, the internal combustion engine 108 may include a turbocharger, an exhaust gas recirculation (EGR) system, a waste heat recovery (WHR) system, and/or other similar components. Further, although not shown, various sensors are included at various positions in the network system 100, such as upstream, at, or downstream of the internal combustion engine 108. The sensors include at least temperature sensor(s), $NO_x$ sensor(s), airflow sensor(s), among others. For purposes of providing examples, the monitoring system 104 uses signals from the $NO_x$ sensor during various engine operations to perform the features, functionalities, and operations of the technical solution (e.g., component health prediction), although other sensors (e.g., temperature sensor, airflow sensor, ammonia sensor, dosage sensor, etc.) can also be used in the similar implementation.

In some implementations, the particulate filter 112 may be positioned downstream of the decomposition chamber 114. For instance, the particulate filter 112 and the conversion catalyst 116 may be combined into a single unit. In some implementations, the dosing module 118 may instead be positioned downstream of a turbocharger or upstream of a turbocharger.

III. Overview of Component Analysis System

The memory 138 of the processing circuit 134 may include various circuits (e.g., modules, components, etc.) to perform the features or functionalities discussed herein. For example, the memory 138 includes at least a data collection circuit 166, a data preprocessing circuit 168, a model development circuit 170, and a prediction circuit 172. The circuits (e.g., data collection circuit 166, data preprocessing circuit 168, model development circuit 170, or prediction circuit 172) are configured to communicate with each other for processing information from components of the network system 100. In some cases, one or more circuits can communicate with external devices, such as another controller, server, or monitored system to process the information. The operations of the circuits are also described in conjunction with FIG. 2.

The data collection circuit 166 is configured to receive signals from component(s) of the network system 100. The signal can be associated with data from the component, such as sensor measurement, internal combustion engine event (e.g., sometimes generally referred to as an engine event or an operating event), status indicator (e.g., flag, etc.) indicative of the operation of the respective component, or other data discussed herein. Receiving the signal can correspond to receiving the data, such as the data collection circuit 166 configured to receive, obtain, collect, or acquire data from components of the network system 100. The data collection circuit 166 can receive data directly from the components or from an intermediate device, such as from a storage, a telematics unit, or other intermediary devices.

The data collection circuit 166 can obtain the data continuously or periodically. For example, in various implementations, the data collection circuit 166 is configured to receive and store live data from the sensors (e.g., or actuator, filter, among other components for determining an exhibited useful life for the respective component). The data collection circuit 166 is configured to receive or collect data respective to the component, such as for processing and determining the exhibited useful life of the respective component. In other implementations, the data collection circuit 166 is configured to obtain data at predetermined intervals (e.g., once daily, weekly, monthly, etc.). In this case, the data may be stored on local memory storage of the monitored system 102 or cloud storage uploaded by the monitored system 102, which can be obtained by the monitoring system 104. Accordingly, the data collection circuit 166 retrieves the data at the predetermined time interval (e.g., configurable by the operator of the network system 100 or administrator of the monitoring system 104) from the local or remote storage. The data collection circuit 166 provides the collected data to the data preprocessing circuit 168.

In some implementations, the collected data can be represented as data points within a graph. For instance, the graph (e.g., described in conjunction with at least FIG. 4) can be represented as a 2-dimensional (2D) graph including an x-axis and a y-axis. For simplicity, the 2D graph may be described herein, although other types of graphs, such as 3D graphs, can also be used. The sensor measurement, the status indicator (e.g., flag of engine event), or information provided by the component can be associated with the y-axis, and the timestamps associated with the data can be associated with the x-axis (or vice versa). The number of data points can be based on the data transfer rate, measurement frequency, or the amount of data requested by the data collection circuit 166 (e.g., one data point every 0.01, 0.1, 0.5, 1, 2, or 5 seconds). In various implementations, the collected data include sensor offsets associated with individual data points. The data collection circuit 166 can determine the sensor measurement by applying the sensor offset to data points, such as applying a first offset to a first data point to determine a first measurement, applying a second offset to a second data point to determine a second measurement, and so forth. In various other implementations, the data collection circuit 166 can obtain the sensor measurements applied with the respective offsets from the monitored system 102.

The data preprocessing circuit 168 is configured to prepare or preprocess the data for utilization by the model development circuit 170 or the prediction circuit 172. The data preprocessing circuit 168 is configured to filter, remove, or sanitize undesired data from the signal. The undesired data includes, for example, null values, data sampling irregularities (e.g., sampling error), among other data points with quality issues. The data sampling irregularities can include one or more errors in the sampling of data. For instance, the one or more sensors of the engine system can be configured to log data at a respective frequency (e.g., 1 Hz, 10 Hz, etc.). In some cases, the data preprocessing circuit 168 identifies, observes, or determines at least one of a change in the logging rate (e.g., logging rate different from the configured logging rate), one or more missing parameters from the data log (e.g., log of stored or recorded data from the one or more sensors), incorrect values of the one or more parameters (e.g., out of range values, among other irregularities in the data), a delay in data reception (e.g., network connectivity issue), at least one gap or inconsistency in the data received from the one or more sensors (e.g., physical or virtual sensor(s)) on timeline. The data preprocessing circuit 168 is configured to filter data sampling irregularities by monitoring or analyzing the logged data, such as stored in the memory 138 or stored remotely on the remote storage (e.g., sometimes referred to as remote data repository, cloud storage, or an external storage drive). For example, the data preprocessing circuit 168 can receive virtual data indicative of an expected $NO_x$ measurement of the sensor (e.g., reference measurement). In some cases, the virtual sensor can be a representation of one or more empirical physics equations, a map-based model, or an embedded model on the ECU, for example. The expected $NO_x$ measurement can be based on at least the exhaust gas flow rate, temperature, fuel consumption, crankshaft spinning rate, $NO_x$ conversion efficiency of the SCR catalyst (if the sensor is downstream of this catalyst), among other data that can contribute to the amount of byproduct produced by the engine 108. The data preprocessing circuit 168 compares the actual measurement from the sensor to the expected measurement. The data preprocessing circuit 168 can determine whether the deviation between the two measurements satisfies a threshold (e.g., greater than or equal to the threshold, or in some cases less than the threshold). If the deviation is greater than the threshold (e.g., exceeds the expected measurement), the data preprocessing circuit 168 can filter the data point. The threshold can be predetermined by the administrator, such as +/−20%, 30%, etc.

The data preprocessing circuit 168 also filters data based on the type of engine event. The data preprocessing circuit 168 is configured to selectively extract data associated with a particular type of engine event or operating condition (e.g., selected by the administrator). For purposes of simplicity, data associated with motoring events of the engine 108 can be selected for processing. In some other cases, the data preprocessing circuit 168 can extract data associated with other types of engine events, such as braking events, idling events, regeneration events, among other outliers (e.g., outlier events). Because the motoring event type is selected, the data preprocessing circuit 168 is configured to filter a subset of data not associated with the motoring event. In various implementations, the data preprocessing circuit 168 is configured to remove a portion of the data associated with the motoring event, such as a certain duration or data samples from the start or the end of individual motoring events.

Upon filtering/sanitizing the data, the data preprocessing circuit 168 aggregates the remaining data associated with the engine event for feature determination. These data can include at least the $NO_x$ sensor measurement, $NO_x$ sensor offset, $NO_x$ sensor invalid status, and deviation between actual and expected measurements. The data preprocessing circuit 168 is configured to provide the aggregated data to the model development circuit 170 for generating or training a model. In some cases, the data preprocessing circuit 168 is configured to provide the aggregated data to the prediction circuit 172 for determining the remaining useful life of the sensor based on feature recognition using the trained model. Other operations for preparing and preprocessing the collected data can be described in conjunction with FIG. 2.

In various implementations, the data preprocessing circuit 168 is configured to crop, utilize, or extract only data (e.g., sensor measurement data) that are within an expected (e.g., target) range from a target operating characteristic associated with various measurements (e.g., a subset of measurements) of the measurement data. A threshold (e.g. a target threshold) can be configured by the administrator, such as 30%, 40%, or 50% error from a target operating characteristic. For example, the target operating characteristic can correspond to the expected characteristic, behavior, measurements, patterns, or features of the data points during the motoring events. The data preprocessing circuit 168 identifies or determines an exhibited operating characteristic based on the operation data and the measurement(s) (e.g., the first or second measurements, patterns, or offsets). The exhibited operating characteristic can correspond to the actual characteristic, behavior, or features of the data points during the motoring events. The data preprocessing circuit 168 can determine a target deviation (e.g., measured differences) between the target operating characteristic and the exhibited operating characteristic. The data preprocessing circuit 168 compares the target deviation to a stored target threshold configurable by the administrator of the monitoring system 104 or based on the trend (e.g., historical data) of data points associated with other monitored systems.

Accordingly, the data preprocessing circuit 168 may only use data points having the exhibited operating characteristics (e.g., patterns or measurements) within the target threshold (e.g., less than the target threshold) based on the differences between the target and exhibited operating characteristics. Otherwise, if the difference between exhibited characteristics and the target characteristics of the data points is greater than or equal to the threshold, such as data points being outside the configured error window, the data preprocessing circuit 168 can filter the data points that are outside the error range or window. In this case, the measurement deviation can be compared to the measurement thresholds only if the target deviation is less than the target threshold (e.g., within an error window).

The model development circuit 170 is configured to generate, develop, or train a machine learning model (e.g., sometimes referred to generally as a model). The model development circuit 170 is configured to use one or more machine learning techniques to train the model, such as regression, decision tree, random forest, neural network, among other supervised or unsupervised classification techniques. For simplicity, the model development circuit 170 can generate and train the model to find patterns from the input data. In this case, the model development circuit 170 can receive the aggregated data as the input.

The model development circuit 170 can receive the aggregated data from various systems (e.g., vehicle systems, monitored systems, etc.) having a respective internal combustion engine and sensors. The collection of aggregated data can be filtered or sanitized using similar techniques. The model development circuit 170 can use data from failed sensors as input for determining the patterns, for example, from installment time to failure time of the sensors. The model development circuit 170 can group the aggregated data based on comparable operating conditions or environments between individual sensors of different systems. For instance, the model development circuit 170 may group the data based on at least one of the positioning of the sensor within the respective system, type, make, or model of the engine, duration till failure (e.g., within 2 years, 1 year, or 6 months), geographical location associated with the system, historical operating characteristics (e.g., temperature exposure, exhaust gas flow rate, etc.), types of fuel, among other categories.

In various implementations, the model development circuit 170 can train a single model or multiple models to detect features associated with the aggregated data of various groups. For example, using the data from one or more groups as input to the model, the model development circuit 170 can compare the patterns, features, or characteristics of the sensor offset over the course of the sensor lifetime. The patterns (or groups of patterns) can be based on or depend on at least one of one or more failure modes of the sensor or failure progression rate. The model development circuit 170 may compare aggregated data from sensors within multiple similar groups/categories. In this case, the model development circuit 170 can combine various characteristics of sensor measurements or offsets from comparable categories to determine an expected pattern associated with these sensors. The model development circuit 170 may reiterate training operations for the model. Other operations or details for generating or training the model can be described in conjunction with at least FIG. 2. The model development circuit 170 can provide the trained model for utilization by the prediction circuit 172.

The prediction circuit 172 is configured to determine the remaining useful life of the sensor (e.g., first sensor). The remaining useful life may be referred to as a duration till failure, failure time, or an exhibited useful life of the sensor. For example, the prediction circuit 172 receives filtered or sanitized data of the sensor from the data preprocessing circuit 168. The prediction circuit 172 can input the data into the trained model. The model can be trained using data from other sensors having comparable operating conditions as the first sensor. In some implementations, the model can be tuned (e.g., model development circuit 170, among other circuits of the monitoring system 104) for predicting the remaining useful life of the sensor. For example, the model can be tuned based on, but is not limited to, the rated life (e.g., operation time indicated in the specification) of the sensor under standard/normal/expected operating condition (s) (e.g., indicated in the specification of the sensor), actual operation conditions imposed on the sensor, failure mode, or average operation time (e.g., actual lifetime) of one or more comparable/similar sensors associated with one or more engine systems (e.g., population data of failed sensors). The specification of the sensor is provided by at least one of the manufacturer of the sensor, the administrator of the monitoring system 104, service technician, among other entities providing the sensor for the engine system, for example.

Subsequent to the model processing the data from the first sensor, such as comparing features of the sensor (e.g., offsets measurements) to one or more thresholds (e.g., deviation threshold) or to features of other comparable sensors, the prediction circuit 172 can determine at least the changes to the sensor offsets over time (e.g., measurement deviations) or the exhibited useful life of the sensor. For instance, the prediction circuit 172 can determine that the sensor offsets exceed certain thresholds which indicates a respective exhibited useful life. In another example, the prediction circuit 172 can determine that the sensor offsets follow a similar pattern as one or more comparable sensors. In this example, the prediction circuit 172 can determine the exhibited useful life based on the failure time of the comparable sensor(s), given the operating condition of the first sensor. Other operations or details for determining the remaining useful life of the sensor can be described in conjunction with at least FIG. 2.

Responsive to determining the useful life, the prediction circuit 172 is configured to send an instruction to the monitored system 102 to indicate the exhibited useful life of the sensor (or other sensors analyzed using the model). For instance, the prediction circuit 172 may command the monitored system 102 to render a visual representation of the exhibited time (e.g., days, months, or years until failure). In some cases, the prediction circuit 172 signals the monitored system 102 to enable a service indicator of a vehicle recommending sensor replacement, for example.

Figure 2:
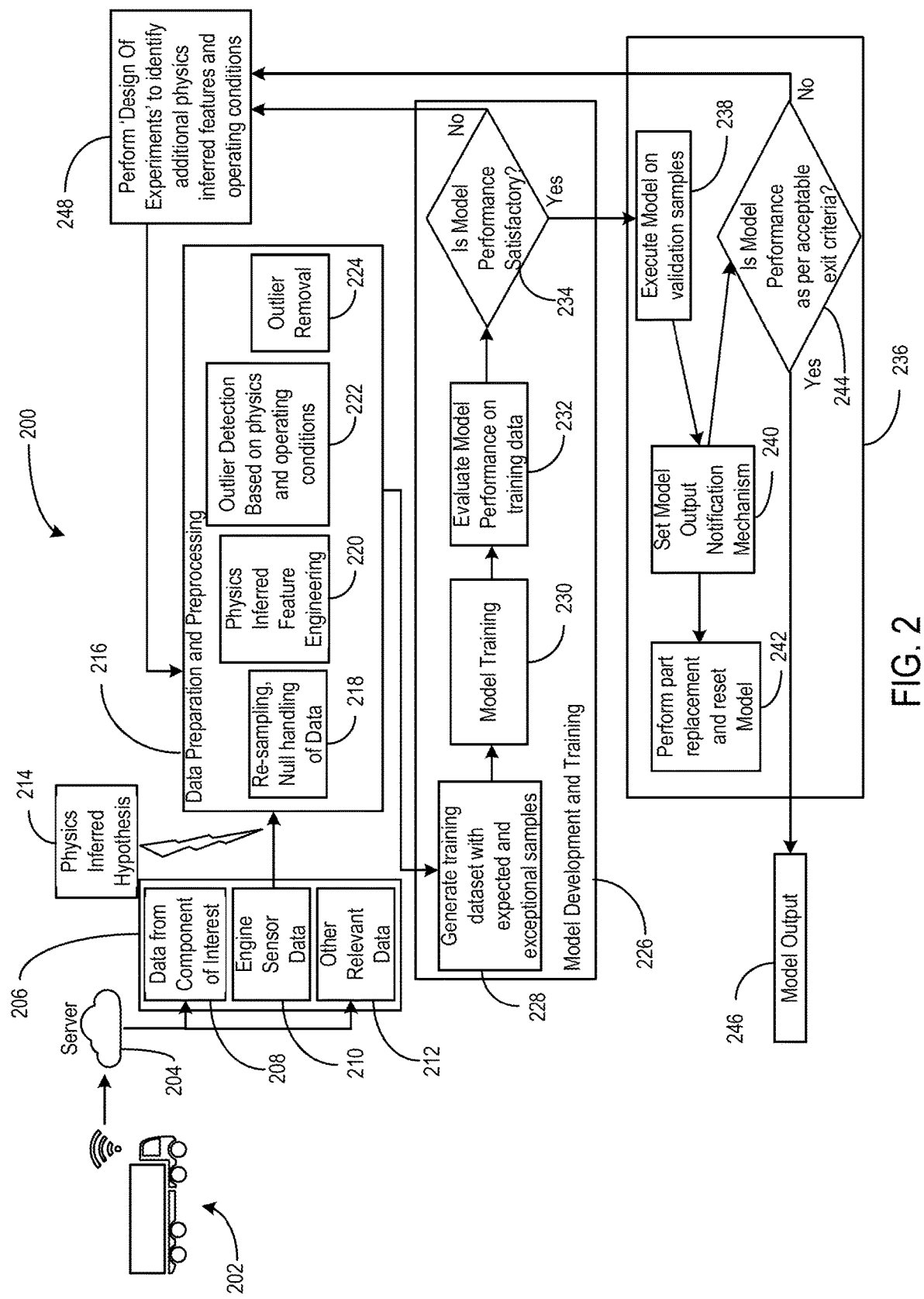
FIG. 2 is a process flow diagram for a modeling process.

FIG. 2 depicts a process flow diagram for a modeling process 200. The processes, operations, or steps of FIG. 2 can be performed, operated, or executed by the components (e.g., monitored system 102, the monitoring system 104, sensor (not shown), etc.) of the network system 100. For example, additional or alternative operations of the modeling process 200 can be performed by the circuit(s) of the monitoring system 104.

The modeling process 200 includes features, operations, or processes performed by one or more vehicles 202 and at least one server 204. The one or more vehicles 202 transmit information to a server 204 (e.g., monitoring system 104, etc.). The server 204 (or other remote devices) performs the operations discussed herein, in conjunction with the monitoring system 104. For instance, the server 204 can include one or more circuits similar to the monitoring system 104 to determine the condition or health of the sensor (e.g., exhibited useful life). The server 204 can include other components, features, or functionalities similar to the monitoring system 104.

Prior to preparing or processing the data herein, the server 204 (e.g., the data collection circuit 166) identifies or obtains various parameters (e.g., prerequisites or conditions) for which sensor failure prognostics follow. For example, the server 204 (or the model executable by the server 204) can obtain or be configured with the parameters by the administrator of the server 204. The operations discussed herein can follow the one or more preconfigured parameters. In some cases, the server 204 determines to use certain parameters based on available information from the component. The parameters include at or indicate least failure mode identification (e.g., classification of failures), physics inferred hypothesis definition (e.g., observation of sensor behavior or sensor measurements during certain engine events), model performance criteria, types of input data (e.g., data that will be used as inputs for the model), and types of output data (e.g., presentation of results from processing the input data).

The failure mode identification indicates the types of failures experienced by the sensor over time. For example, the $NO_x$ sensor failures are classified into various failure modes, such as heater degradation, platinum (P)+ crack, P-peel off, poisoning, contamination, circuit failures, harness failure, among others. One or more of the failure modes (e.g., heater degradation, platinum shift, or platinum peel off) can be progressive failure modes. Progressive failure modes are observable over the course of their lifespan, such as during the aging of the sensor or under certain operating conditions. The progressive failure modes can be identified using the historical data of the respective sensor.

The physics inferred hypothesis definition indicates at least the type of engine events associated with the input data for processing (or training) by the model. For example, because $NO_x$ sensors tend to fail due to degradation of the heater element over time, the server 204 (e.g., data collection circuit 166) monitors or receives monitored $NO_x$ sensor output data (e.g., $NO_x$ sensor measurement with or without sensor offsets) during a certain engine operation or event. The engine event refers to an occurrence of a particular engine mode or operation having an expected amount of, for example, byproduct, heat, exhaust flow rate, etc.

For example, with a $NO_x$ sensor, the engine event can be occurrences (e.g., first occurrence, second occurrence, etc.) when no byproduct is produced or occurrences when the maximum amount of byproduct may be produced by the engine 108. For purposes of simplicity, and to provide examples herein, the engine event can be the motoring mode of the engine 108 when no fueling occurred within the engine 108, but other types of motoring modes can be used, such as during maximum fueling rate events, braking mode, etc. For instance, the $NO_x$ sensor includes multiple internal parts (e.g., heater circuit/element, etc.), which can be degraded due to thermal (e.g., heater degradation). In this case, if the heater element of the $NO_x$ sensor is degraded or damaged, the $NO_x$ sensor may output false/inaccurate $NO_x$ ppm values. Therefore, during no $NO_x$ engine event (e.g., no fueling event or condition), observations of the degraded $NO_x$ sensor generating $NO_x$ ppm output during this engine event over time can provide an (e.g., early) indication of thermal degradation of the $NO_x$ sensor. Similarly, for other types of sensors, such as temperature sensors, motoring events associated with minimum operating temperature occurrences or maximum operating temperature occurrences can be observed. As such, the server 204 (e.g., prediction circuit 172) uses the sensor measurements during these engine events as inputs to the model (and monitoring the sensor response over time) for providing early indications of heater degradation or $NO_x$ sensor failures prior to triggering or activating the fault code of the sensor.

In further example, the behavior of various failure modes (e.g., platinum shift or platinum peel off) of the $NO_x$ sensor can be observed or determined by an abnormal rate of change of the $NO_x$ sensor (e.g., measurements or offsets). For example, the abnormal rate of change can refer to the rate increased beyond a maximum threshold (e.g., upper threshold) or decreased below a minimum threshold (e.g., lower threshold). The server 204 (or other monitoring systems) monitors the rate of change through $NO_x$ sensor status (e.g., configured offsets for the $NO_x$ sensor). The server 204 (e.g., the prediction circuit 172 using the model) compares the $NO_x$ sensor output (e.g., rate of change) with a reference output (e.g., virtual sensor output) at the preselected or preconfigured engine events over time, for example, to determine the exhibited useful life. In this case, the virtual sensor can be exposed to similar operating conditions as the physical sensor (e.g., while generating the output). The output value of the virtual sensor can be used as a reference output value for the physical sensor output (e.g., for comparison).

The types of input data for each physics inferred hypothesis include at least one of $NO_x$ measurement monitored during the specified engine events, data logging frequency (e.g., frequency or data rate of the sensor measurement during the engine events), rate of progression of damage, data volume, model execution frequency, or historical data conditions, dew point temperature, exhaust gas flow rate, engine operating conditions (e.g., for identifying braking, acceleration, or other engine events), idling events, virtual sensor outputs, among other parameters related to operating conditions of the engine system. The historical data conditions include data collected or monitored for hours, days, weeks, months, or other time periods, such as based on the rate of progression of failure mode (e.g., sometimes referred to as a rise in sensor offset). The historical data conditions can be used by the machine learning model as one of the criteria for accurate prediction or determination of sensor health. In some cases, the amount of historical data availability may be used as part of the inputs for the machine learning model, such as to determine the percentage of accuracy for the remaining operating time prediction. For example, the data logging frequency reflects the number of data points used as input during the motoring event, such as one data point every second associated with a 1 Hz logging frequency. For example, the rise in sensor offset, when monitored under specified or controlled operating conditions (e.g., motoring events) can indicate an effect of heater degradation at various points in time, thereby reflecting the damage progression on the sensor. In another example, the rise in sensor offset can indicate an increase in deviation of physical sensor output (e.g., compared to virtual sensor output), thereby indicating the progressive damage on the sensor. The data volume indicates the minimum amount of data from individual sensors to be used for training, such as 1 month, 6 months, 1 year, 3 years, 5 years, or 7 years of data before failures. The model execution frequency indicates the frequency of obtaining data and/or processing the data using the model, such as static hourly, daily, weekly, monthly, yearly, etc. In some cases, the frequency of executing the model may be determined based on at least one of the rate of progression of the failure mode, the time for arranging or performing maintenance (e.g., replacement, repair, etc.) on the sensor subsequent to notifying the user to perform maintenance on the sensor, among others.

In various implementations, the model execution frequency is based on the exhibited life of the sensor. For instance, based on the prognostic results, the server 204 (e.g., prediction circuit 172) can be configured to reevaluate the exhibited useful life of the sensor at midtime between the previous execution time and the expected failure time or a predetermined duration (e.g., 1 year, 2 years, etc.) before the expected failure time.

The model performance criteria indicate at least a minimum acceptable performance of the model prior to utilization or execution. The server 204 can evaluate the model using sample data from various vehicles 202 or monitored systems having an internal combustion engine and sensor(s). The sample data can include a subset of a failed sensor historical data for the model to predict their exhibited useful life. The sample data can also include actual exhibited useful life, such that the model can compare and adjust its processes or evaluation techniques based on the deviation between the predicted and actual exhibited life. The sample data can include other information for training, updating, improving, or validating the model. If the model satisfies the minimum acceptable performance (e.g., the deviation between predicted and actual results less than a threshold, such as less than a month difference for above 90% of the sample data), the server 204 can use the model for determining the exhibited useful life of subsequent sensors (or components) of the monitored system (e.g., monitored system 102).

The types of output data include one or more representations of the model execution results, such as a heat map, notification, etc. In some cases, the representation(s) of the model execution results (e.g., heat map, notification, etc.) can be shown in conjunction with at least one of FIG. 7, 8, or 9. For example, the server 204 (e.g., prediction circuit 172) can use the model to generate a heat map representation of the results based on one or more (e.g., subsequent or sequential) executions (e.g., daily, weekly execution, etc.) of the model on input data, such as to indicate failure progression of the sensor, which can represent the remaining useful life of the sensor on a timeline. The notification can indicate the sensor is approaching failure (e.g., 6 months, 3 months, etc.) until failure. The notification can be a visual, audio, or any other type of presentation. The server 204 shares the notification with at least one of the operator, the respective entities handling component/part replacement, or the administrator of the server 204. The server 204 is configured to share the notification before further progression of the degradation that triggers a fault code causing unplanned downtime for the operator. The model execution results can be presented to various entities in other manners.

In various implementations, multiple models can be generated, trained, and tested against each other for performance evaluation. In certain implementations, the administrator, technician, or engineer can evaluate the model for its performance in failure mode identification and determine the true and false positives of the output results. Herein, the server 204 (e.g., circuit(s)) can execute the operations to determine the health of the component based on or according to the parameters.

Based on the parameters described above, the server 204 is configured to generate, train, update, or execute one or more machine learning models discussed herein. The server 204 (e.g., data collection circuit 166) is configured to receive or obtain data from various vehicles 202, such as directly from the sensor(s) (e.g., the component of interest) or through an intermediary (e.g., monitored system 102) (206). The data include data from the component of interest (e.g., $NO_x$ sensor, among other types of sensors, such as particulate matter (PM) sensor, ammonia (NH3) sensor, multi-gas sensor, etc.) (208). The data include engine sensor data (210). The engine sensor data indicates any operation of the sensor, such as fueling operation (or no fueling), crankshaft spinning, among other information associated with the engine 108 to indicate occurrences of motoring events. The data also include other relevant data (212). The relevant data include at least timestamps syncing the operation time between the engine sensor data and the sensor data, installation date of the sensor, type of sensor, type of engine, among other data utilized herein.

The server 204 is configured according to a physics inferred hypothesis (214). The physics inferred hypothesis can indicate the type of engine event (e.g., motoring event) to use for model development. As shown, such as in operation (222) or (224), based on the physics inferred hypothesis, the server 204 can extract a subset of data associated with the motoring events. The extraction of data based on the physics inferred hypothesis can be described in further detail in conjunction with FIG. 3, for example.

In various implementations, the server 204 utilizes the physics inferred hypothesis in the model (or one of the models). The physics inferred hypothesis may refer to or correspond to one of the hypotheses used by the model to determine the failure time of the sensor. For instance, server 204 monitors sensor offset (e.g., $NO_x$ sensor offset) during the engine events (e.g., the motoring events) over a predetermined duration. As a hypothesis, the monitored sensor offset indicates thermal degradation or poisoning of the sensor, which the sensor 204 can use to predict or determine the failure time or exhibited useful life of the sensor.

In some aspects, the server 204 utilizes an additional or alternative hypothesis (e.g., physics inferred hypothesis) in the model. For example, as a hypothesis, stable monitored $NO_x$ and O2 readings or measurements over a certain time (e.g., days, weeks, months, etc.) can indicate poisoning of the sensor (e.g., $NO_x$ sensor), such as to predict a "persist not valid" based failure of the sensor in advance (e.g., a predetermined time from failure in advance).

The server 204 performs data preparation or preprocessing using the collected data and according to the physics inferred hypothesis (216). For example, the server 204 (e.g., data preprocessing circuit 168) may detect data quality issues, such as null values or data sampling irregularities (e.g., sampling error) (218). Prior to further processing the data, the server 204 can handle or address the data quality issues by filtering the null values or sampling irregularities, such as using any data filtering technique to remove the null values and irregularities.

Further, the server 204 performs physics inferred feature engineering by aggregating the filtered data for feature determination (220). For example, the server 204 determines the $NO_x$ sensor offset during motoring events based on an indication from the physics inferred hypothesis. The server 204 determines the $NO_x$ sensor invalid status. The server 204 determines the deviation (e.g., error) between actual and virtual $NO_x$ sensor outputs under associated operating conditions (e.g., temperature, exhaust gas flow rate, fuel consumption, etc.). The sensor offset, invalid status, deviation, among other variables can be parts of the features determined by the server 204 according to the physics inferred hypothesis.

Responsive to the physic inferred feature engineering, the server 204 maps the aggregated features on a timeline (e.g., graph, table, map, etc.). When observing the aggregated features with respect to the failure occurrence of the $NO_x$ sensor, the server 204 can identify or detect certain outliers within the data points on the timeline (222). In some cases, the aggregation of the features with respect to the failure occurrence includes an offset of the sensor during (e.g., qualified or approved) engine event(s) aggregated for the duration of the engine event (e.g., mean of offset calculated over the engine event duration without wait time). In some instances, the aggregation of the features with respect to the failure occurrence includes the aggregation of sample-based percent error calculation under certain operating conditions. For example, the server 204 detects the outlier based on the operating conditions, such as exhaust flow rate, fueling amount, or $NO_x$ sensor response during at least one of braking events, engine idling, catalyst regeneration event, among others. In this case, any operating condition or event that is not a motoring event may be discarded from the training or validation. As such, the server 204 (e.g., data preprocessing circuit 168) is configured to remove the outliers from the filtered data to be used as inputs (224). The server 204 may detect and remove other outliers using any data filtering technique or outlier detection technique to avoid or minimize false-positive or false-negative results.

Subsequent to preparing or preprocessing the data, the server 204 (e.g., model development circuit 170) is configured to develop and train at least one model (226). To develop the model, the server 204 generates a training data set with expected and exceptional samples (228). For example, the $NO_x$ sensor measurement may be expected to drop to its offset value (e.g., within ±10 ppm for a healthy sensor) after a predefined duration (e.g., 2 seconds, 5 seconds, 10 seconds, etc.) responsive to the start of a motoring event (e.g., engine motoring). During engine motoring, because there is no fueling, it is expected that no $NO_x$ is produced by the engine. As such, after the predefined duration (e.g., derived from the specification of the sensor, such as from the manufacturer, allowing the sensor to activate or wake up and respond to changes in fueling) when motoring starts, the measurement of the $NO_x$ sensor represents or reflects the offset value applied to the sensor.

The offset value refers to a calibration value applied to the sensor over time, such as due to progressive degradation of the sensor (e.g., increase or decrease in the sensitivity of the sensor), damage to the sensor, poisoning of at least a part of the sensor (e.g., heater element or circuit), water intrusion to the part of the sensor, etc. The offset value can be applied by a technician during a service session, automatically by the monitored system 102 based on the expected degradation of the sensor over time, or by the administrator of the server 204, for example. Hence, the positive or negative $NO_x$ sensor reading after a predefined time (e.g., calibratable time) when motoring starts is due to the positive or negative offset value (e.g., offset error), respectively. Accordingly, the server 204 can categorize the preprocessed data into at least the expected samples and exceptional samples during a motoring event based on whether the offset value of individual data points is equal to or exceeds a threshold, such as ±10 ppm or any configurable amount. Examples of $NO_x$ offset values for healthy or failed sensors can be shown in at least FIGS. 3 and 5-6.

Once the training data sets are generated, the server 204 (e.g., model development circuit 170) feeds the training data sets (e.g., combined data having expected and exceptional behaviors of the $NO_x$ sensor) to the model (e.g., regression, classification model, etc.). By feeding the training data sets and providing an indication to the model that the data sets are training samples, the server 204 can train the model accordingly (230). Because the training data sets (e.g., training samples) are validated or include respective known states of health associated with the measurement values, the model can be trained to recognize features of subsequent samples (e.g., real-world samples). The model can extrapolate the features (e.g., $NO_x$ sensor offsets during motoring events), determined based on physics inference, in the time domain to predict the remaining useful life of the component. For example, the remaining useful life may be outputted in cases where the model expects or determines that the sensor will fail. If the model does not identify the potential failure of the sensor, or if the remaining useful life is above a threshold (e.g., day(s), week(s), month(s), year(s), etc.), the model may output an indication of a healthy sensor without providing a specific time for the remaining useful life.

Once trained with the training samples, the server 204 evaluates the model performance on second training data (232). In this case, the training samples (e.g., first training data) refer to data sets used for training the model (e.g., include features with known states of health up to failure) and the second training data refers to training data for evaluating the model (e.g., include features without the states of health). The second training data may be real-world data obtained from various failed sensors. In some cases, the second training data may be created for evaluation purposes based on an aggregation of multiple real-world data. The server 204 can evaluate the model using various testing or evaluation techniques. For example, the server 204 inputs the second training data to the model and an indication to execute a health prediction process. The server 204 can receive an output from the model executing the second training data. The output indicates a first exhibited useful life of a sensor associated with the second training data. The server 204 compares the first exhibited useful life to a second exhibited useful life indicative of the actual length of time until failure of the sensor. The server 204 repeats the process for various iterations (e.g., 10, 50, 100 times, etc., configured by the administrator), such as until the sensor is predicted to fail, and/or replacement of the sensor of the engine system, thereby resetting the historical operation data of the sensor or restarting execution of the model.

The server 204 aggregates the results of the model from the evaluation to determine whether the model performance is satisfactory (234). For example, the server 204 (e.g., model development circuit 170) determines the performance of the model based on a ratio or percentage of times (out of the various iterations) the first exhibited useful life is within a predetermined duration (e.g., 1 year, 6 months, 3 months, etc.) of the second exhibited useful life. In various implementations, the server 204 determines the performance as an aggregated score based on the deviation between the first exhibited useful life and the second exhibited useful life for the various iterations. Each iteration can be assigned a score (e.g., from 0 to 5, 0 to 10, 0 to 100, etc.) based on the respective deviation between the exhibited useful lives. The score associated with the respective deviation can be configurable by the administrator. For example, a score of 0/5 corresponds to over 1 year deviation, a score of 1/5 corresponds to 10 months to 1 year deviation, a score of 2/5 corresponds to 8 months to 10 months deviation, a score of 3/5 corresponds to 6 months to 8 months deviation, a score of 4/5 corresponds to 4 months to 6 months deviation, and a score of 5/5 corresponds to less than 4 months deviation. The server 204 aggregates the score to determine the performance as the ratio or percentage. In some cases, the aggregation of the score can be a part of the model (e.g., the execution process of the model).

The server 204 compares the performance to a performance threshold, which may be configured to, for example, 85%, 90%, 95%, etc. The performance threshold is configurable by the administrator. If the performance does not satisfy the threshold (e.g., below the threshold), the server 204 performs a design of experiment (DOE) (or other analysis on the training data set and the model) (248). By performing the DOE, the server 204 is configured to identify additional or alternative physics inferred features and operating conditions (e.g., engine events), such as additional sensor offset values during a braking event, or further filtering the current sensor offset values (e.g., current data points) during the motoring event. Examples of further filtering the data points can include having one offset measurement representing a respective motoring event or performing other filtering techniques to identify erroneous data points. As such, the server 204 is configured to return to prepare or preprocess additional data or the current data sets, thereby redeveloping and retraining the model.

If the performance satisfies the threshold (e.g., at or above the threshold), the server 204 performs validation procedures on the model (236). For example, the server 204 (e.g., model development circuit 170 or prediction circuit 172) executes the model on validation samples (238). The validation samples may be real-world data or generated based on the real-world data of failed sensors. The model executes the validation samples similar to the second training data, for example. The validation samples can be associated with respective known states of health, where the output of the model is compared to the known state. For instance, the training data can correspond to data of one or more (e.g., comparable or similar) sensors generated from known or identified samples of a healthy state processing into an unhealthy state, until the failure of the sensor. The validation samples can include new or additional data sets from the NO$_x$ sensor from one or more engine systems having the same engine type/family/model, where the engine system(s) undergo or operates under a similar duty cycle for a similar monitoring period, for example. In this case, after the model (or other similar models) predicted the health state of the sensors associated with the one or more engine systems, the samples can be tested (e.g., lab-tested) to classify the samples into true or false positives, thereby evaluating the model performance and tuning the model.

Responsive to executing the model, the server 204 sets a model output notification mechanism (240). The model output notification mechanism refers to the type(s) of output indicating the exhibited useful life of the sensor or whether the sensor is approaching failure. The output notification mechanism includes at least one of a push notification, a graphical interface, an audio notification, among others. In some cases, the output notification mechanism includes a heat map generated based on various executions of the model, such as daily, weekly, semi-weekly, monthly, etc.

In various implementations, the server 204 receives an indication of part replacement (e.g., the sensor has been replaced) (242). The sensor operating hours can be used as an indicator of part replacement and to reset the historical data associated with the prior or replaced sensor. In some cases, the prior sensor can be tested or evaluated (e.g., via a lab) for true or false-positive result classification to further train the model. If the sensor is replaced, the historical data of the prior sensor can be reset, transferred, or removed from further prediction (e.g., to avoid combining old and new sensor data). For example, the server 204 resets the model by removing historical data associated with the prior sensor. Subsequent historical data of the installed sensor can be collected as inputs for the model for component health prediction.

In certain implementations, the server 204 determines whether the model performance satisfies or as per acceptable exit criteria (244). For example, the model can generate one or more heat maps as part of the model output. The model can determine the rolling sum (e.g., summation of a sequence of numbers) based on encoded heat maps (e.g., converted heat map into values) for additional or final classification of model output. The model can compare the rolling sum against the actual state of health of the sensor (e.g., historical data of the failed sensor), where the activation of the fault code can be set as the exit criteria. The sensor is confirmed to have failed, for instance, when there is an activation of the fault code (or is lab-tested). Because the model(s) is developed to predict the failure prior to actuation or triggering of the fault code, the fault code can be set as part of the exit criteria to classify samples as true or false positives, for example. If the model performance does not satisfy the exit criteria, the server 204 proceeds to operation 248. Otherwise, the server 204 proceeds to operation 246. An example of the heat map(s) can be shown in conjunction with at least FIG. 9.

In some implementations, the exit criteria include at least a performance threshold (e.g., similar to operation 234), such as comparing results from processing the validation samples to the threshold. The exit criteria also include at least a valid model output notification mechanism (e.g., based on whether the vehicle 202 supports the mechanism, such as having a display device, audio system, etc.) that is set for notifying the user of the exhibited useful life. The exit criteria include any other thresholds or parameters configurable by the administrator. In some cases, the exit criteria include existing diagnostic flags logged in the data repository (e.g., memory 138).

If the model performance satisfies the exit criteria, the server 204 outputs or enables the model for utilization (246). The exit criteria can be an indicator of qualification or predetermined accepted model accuracy, precision, among other satisfactory conditions. Hence, when the model performance satisfies the exit criteria, the server 204 (e.g., one or more circuits) can utilize the model to determine the health or exhibited useful life of the sensor. Subsequently, the server 204 (among other servers, processors, or controllers) can use the trained model to predict the component health. The server 204 can output a single model for various components. In various implementations, the server 204 can output multiple models, each model associated with a type of component, a type of engine 108, or other types of parameters. Therefore, the server 204 can use the trained model to predict the health of the sensor.

In some implementations, the server 204 (e.g., model development circuit 170) is configured to generate multiple models based on varying sets of training data, collected features, or engine events. The server 204 can generate an ensemble model by integrating the individual models to predict any progressive damage-based failure modes of the sensor. The integration of various models can enhance the model performance. Because the one or more models are developed based on physics (e.g., the hypothesis used in the model(s) can be based on physical formulas and chemical reaction-based knowledge in addition or alternative to empirical or population-based model development), the model can be agnostic to engine platform and component (e.g., can be executed for any engine platform, component manufacturers, etc.).

Figure 3:
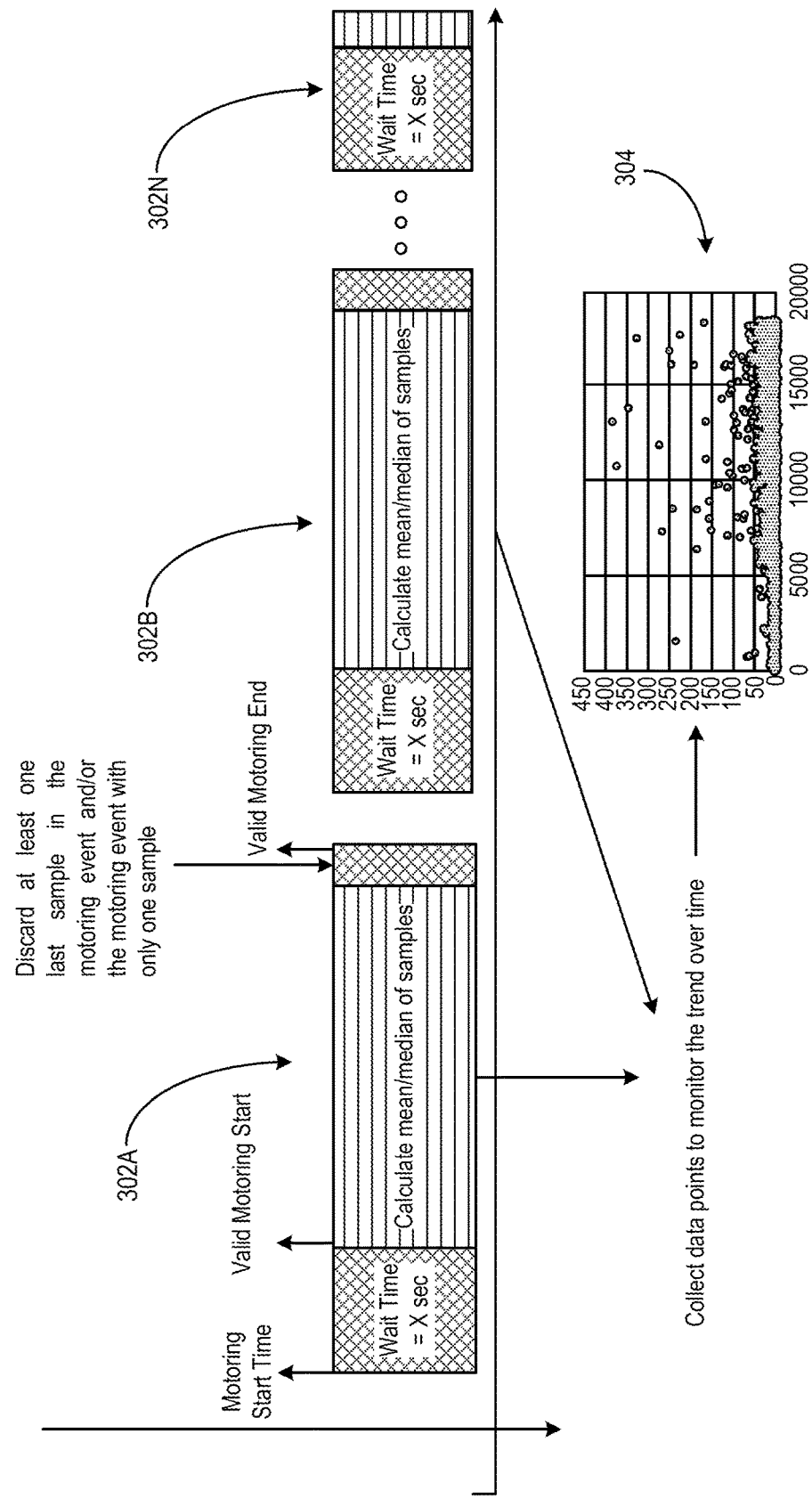
FIG. 3 illustrates of an example internal combustion engine event and measurement data.

Referring to FIG. 3, depicted is an example illustration 300 of internal combustion engine event and measurement data. The operations discussed herein can be performed by the monitoring system 104, the server 204, the server, among others. Certain operations discussed herein can be described in conjunction with FIGS. 1-2. The illustration 300 includes motoring events 302A-N (e.g., sometimes referred to as motoring event(s) 302) plotted on a graph. The x-axis of the graph represents the time and y-axis represents an indication of the motoring event 302 (e.g., bits of 0 and 1 indicating the motoring event). For example, the motor sensor provides bits of 1 (or 0) at the motoring start time and bits of 0 (or 1) at or after the valid motoring end time.

To avoid or minimize the collection of data not representative of the sensor offsets during the motoring events 302, the server (e.g., the server 204 or the monitoring system 104) is configured to filter a portion of the sensor data associated with the motoring event. For example, the server 204 (or monitoring system 104) is configured with a wait time of a certain duration, such as 1 second, 2 seconds, etc. The server 204 filters the sensor data during the wait time from the motoring start time. Further, the sensor is structured to discard at least one sample in the motoring event 302 before the valid motoring end time. For simplicity, the sensor may be configured to collect data at a 1 Hz frequency, such that each sample is recorded per second. As such, the server 204 is configured to discard data from the last second of the motoring event 302. In various implementations, the server 204 is configured to discard a certain motoring event 302 that occurred less than the wait time, having less than a predetermined number of samples, or having only one sample after the wait time, for example.

Once at least one of the last samples at the end of the motoring event and the samples during the wait time are filtered, the server 204 can collect data points (e.g., sensor offset values) of the sensor during the motoring events 302. The server 204 uses the collection of data points to monitor the trend (e.g., features) of the offset values over time, such as shown in graph 304. Graphs representing the changes in the offset values over time can be shown in at least FIGS. 5-6. The server 204 is configured to input the sensor offset values to the machine learning model to predict the health condition.

In various implementations, as shown in graph 304, the server 204 is configured to collect or extract data points associated with motoring events from the sensor data. The server 204 executes the model to monitor the trend of the data points (e.g., sensor offset values) over time. The trend of the data points can indicate the rise of the sensor offset, for example, due to degradation of the sensor (e.g., by exposure to heat, poisoning by the byproduct of the exhaust gas, etc.). Based on the rise or fluctuation of the offsets (e.g., increase or decrease of the offset values), the model executed by the server 204 can output a prediction of the failure time or remaining useful life of the sensor. Herein, operation(s) performed by the server 204 may correspond to or be associated with the operation(s) performed by the model that is executed by the server 204. For example, the graph 304 illustrates an increase of the $NO_x$ sensor offset during various motoring events over the time when the heater element of the sensor is degraded.

For example, the server 204 can determine a deviation (e.g., measurement deviation) between a first offset value (or a first sensor measurement) at a certain occurrence of the motoring event and a second offset value (or a second sensor measurement) at another occurrence of the motoring event. Based on the difference in time between the two occurrences, such as the duration between the two data points, and the aggregated operating conditions exposed to the sensor (e.g., temperature, exhaust flow rate, exhaust gas concentration, etc.), the server 204 is configured to obtain or determine a threshold. This threshold indicates the expected changes to the sensor offsets between two occurrences (e.g., two timestamps) based on at least one of the operating times of the sensor at the two occurrences, operating conditions exposures, the offset values associated with the two occurrences (e.g., higher or lower than expected given the operating conditions and operating time), among other variables.

The server 204 is configured to compare the deviation to the threshold. If the deviation satisfies the threshold (e.g., the deviation is greater than or equal to the maximum (expected) offset deviation or less than or equal to the minimum offset deviation), the server 204 can determine that the sensor is unhealthy. As such, based on various parameters including the total operating time of the sensor, the extent of the measurement deviation, the offset value (e.g., at least one of the first sensor measurement or the second sensor measurement), or other information associated with the sensor measurement, the executed model is configured to output a failure time or an exhibited useful life of the sensor. If the deviation does not satisfy the threshold (e.g., the deviation is less than the maximum offset deviation or greater than the minimum offset deviation), the server 204 is configured to either indicate that the sensor is healthy. In some cases, if the threshold is not satisfied, the server 204 can be configured to provide a predetermined exhibited useful life based on at least one of the operating time of the sensor, the current offset value, among other sensor data.

Figure 4:
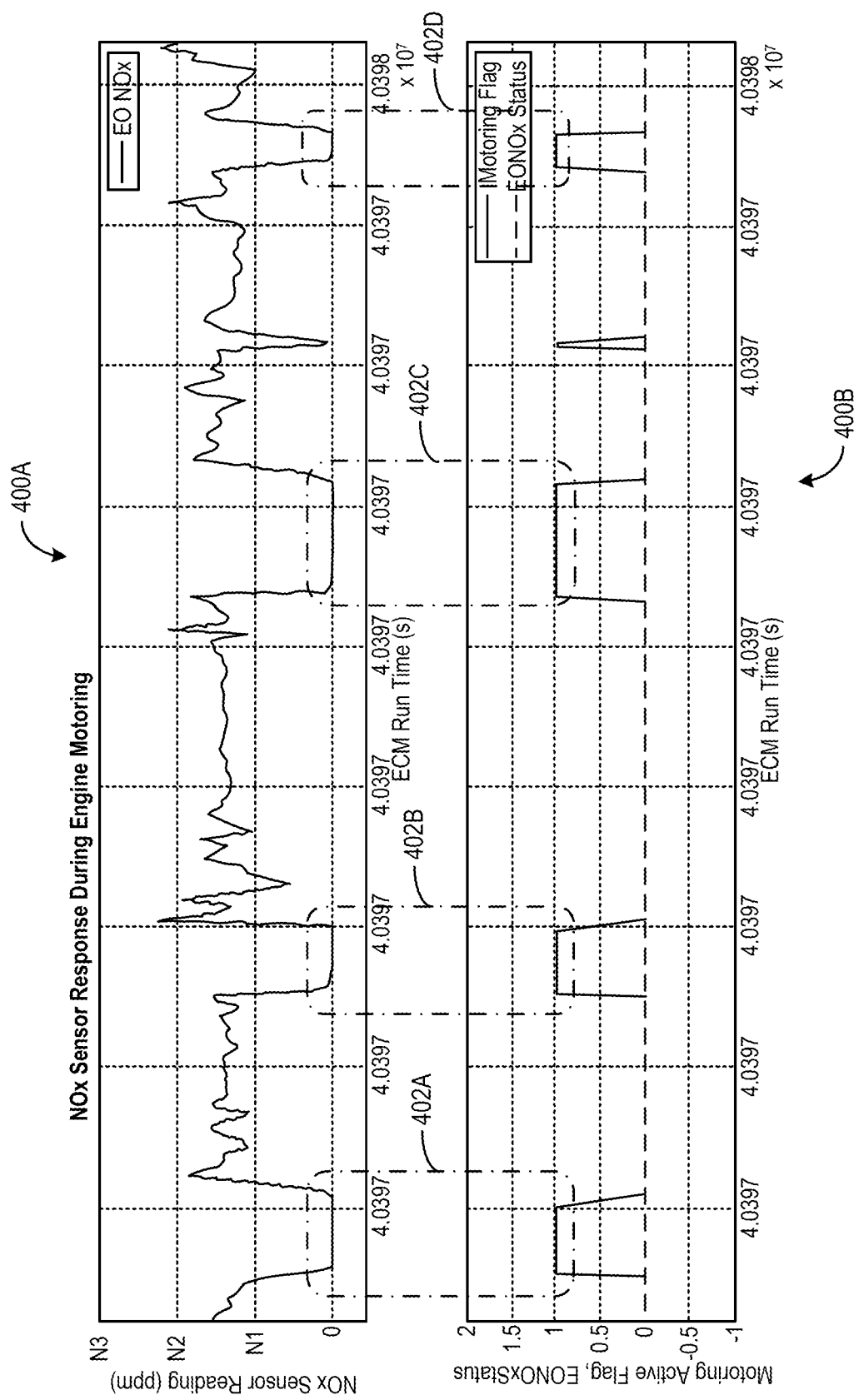
FIG. 4 illustrates an example $NO_x$ sensor response during engine motoring for a failed sensor.

Referring to FIG. 4, an example $NO_x$ sensor response during engine motoring for a failed sensor is illustrated. As shown, the illustration includes graph 400A and graph 400B. Graph 400A includes $NO_x$ sensor reading (e.g., exhaust output (EO) $NO_x$) over a portion of the engine control module (ECM) run time. This $NO_x$ sensor reading can be from a virtual $NO_x$ sensor, outputting the expected $NO_x$ sensor reading based on the various operating conditions of the network system 100 (or any other systems having an internal combustion engine and the sensor(s)). In some cases, the $NO_x$ sensor reading can be from the measurements of the physical $NO_x$ sensor. Graph 400B includes the EO $NO_x$ status and the motoring flags represented by bits of 1 and 0 (e.g., for active or inactive, enable or disable, or vice versa) over the same ECM run time.

The motoring flags indicate the start and end of the motoring events. Portions 402A-D (e.g., sometimes referred to as portion(s) 402) represent the motoring events. At portions 402, $NO_x$ sensor measurements drop to 0 during the motoring events. Further, the EO $NO_x$ sensor status monitoring indications of $NO_x$ output can be zero. However, in graph 400B, this $NO_x$ sensor outputs a constant 0 reading for the EO $NO_x$ status, which indicates a failure of the $NO_x$ sensor. For example, for a healthy sensor, the EO $NO_x$ status may be 1 outside of the motoring events 402 and 0 during the motoring events 402. Because one or more components of the aftertreatment system 103 (e.g., the reductant doser, catalyst, etc.) rely on at least the EO $NO_x$ status, the error output can cause inaccuracy or erroneous configuration, adjustments, or activations (or no activations) of these components, thereby leading to byproduct slippage. Accordingly, the systems or components (e.g., monitoring system 104, server 204, etc.) discussed herein can execute one or more models to indicate the health condition of the sensor prior to failure.

Figure 5B:
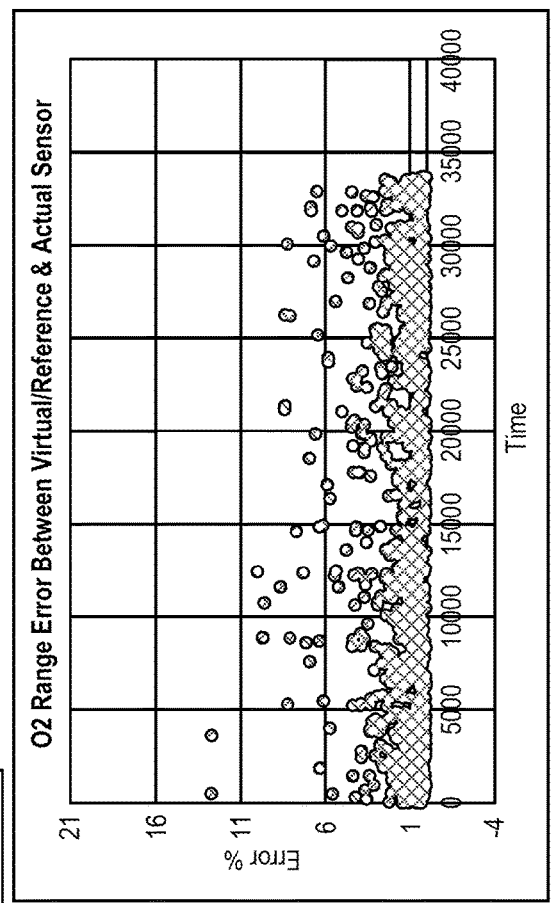
FIGS. 5A-C are graphs of example expected measurements of a $NO_x$ sensor.
Figure 5A:
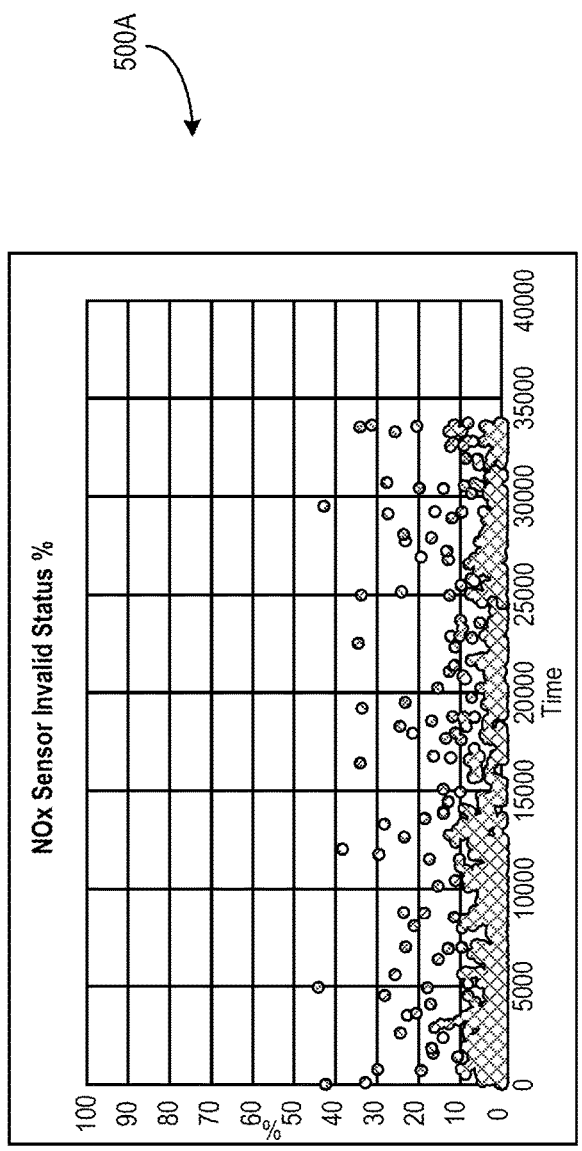
Figure 5C:
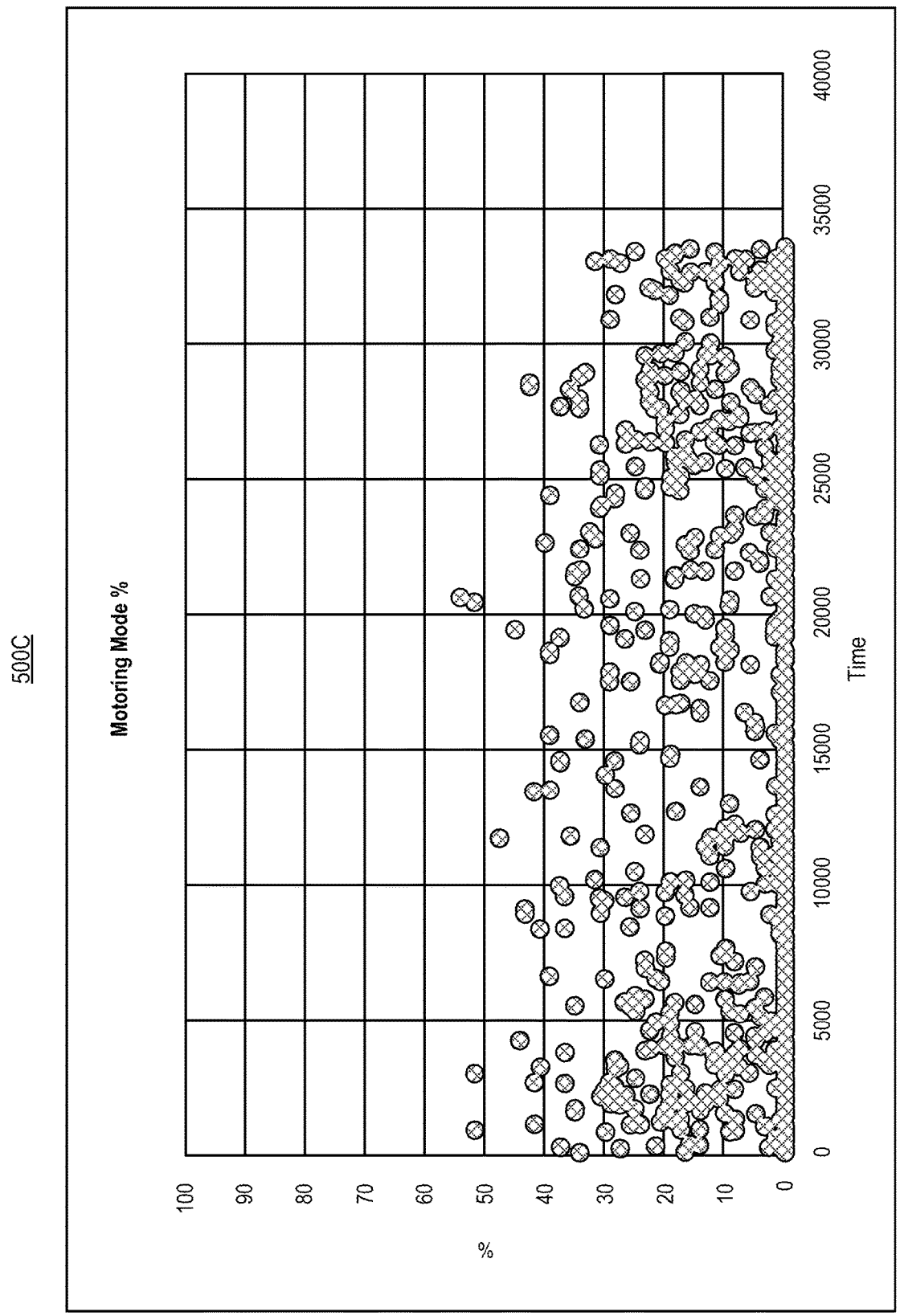

FIGS. 5A-C depict graphs 500A-C of example expected measurements of a $NO_x$ sensor. An unhealthy $NO_x$ sensor can be identified based on the presence of a corresponding active sensor fault code. The graphs 500A-C represent various features calculated from a healthy $NO_x$ sensor data, without having an active sensor fault code. The graphs 500A-C include data points associated with a healthy sensor (e.g., $NO_x$ sensor, engine sensor, virtual sensor, etc.). In this case, the data points represent the expected $NO_x$ sensor response with respect to the rate of change of $NO_x$ sensor output. The x-axis of the graphs 500A-C corresponds to the operation time (e.g., the operation time of one or more sensors, the engine, or other associate components). For example, the server 204 (or monitoring system 104) is configured to receive and plot data points from at least the $NO_x$ sensor. Graph 500A includes data points indicative of the percentage of $NO_x$ sensor invalid status activation or enablement trend for the healthy sensor. Based on physics (e.g., physics inferred hypothesis), the sensor can be expected to show at least one invalid status during operation. The percentage of sensor invalid status (e.g., in conjunction with other relevant features, such as motoring model percentage, the duty cycle of the engine, O2 error between physical and virtual $NO_x$ sensor, etc.) is used to determine the state of health of the sensor via the application of the model (e.g., these features can be used as input(s) for the model). For a healthy sensor, the aggregated invalid status over time may be below 50%, 40%, or 30%, for example. If the heater element of the sensor is degraded, the sensor may not be able to control its internal temperature around the target value, such as a change in the sensor response to exhaust flow. In other failure modes, such as poisoned electrode(s), the internal control loops of the sensor may not be able to maintain stability, which can be observed via the status information received from $NO_x$ controller.

Graph 500B includes data points indicative of the deviation percentage (e.g., error percentage) between the O2 measurement from the physical $NO_x$ sensor and the O2 measurement from the virtual $NO_x$ sensor. The virtual $NO_x$ sensor performs the measurement based on various operating conditions of the network system 100, such as exhaust gas flow rate, exhaust gas temperature, fuel consumption, etc. For a healthy sensor, as shown from 5000 hours to 35000 hours, the deviation can be at or below approximately 10% (e.g., 9%, 11%, 12%, etc.).

Graph 500C includes data points indicative of the motoring mode percentage associated with the data points of graphs 500A-B. For example, the motoring mode percentage can represent the frequency (e.g., how often) of the engine 108 to operate under the motoring mode between an engine start and engine stop events (e.g., during individual trips or ignition of the engine 108 until stop). The data points of graphs 500A-B can be collected during at least a portion of the motoring events, such as shown in graph 500C.

Figure 6A:
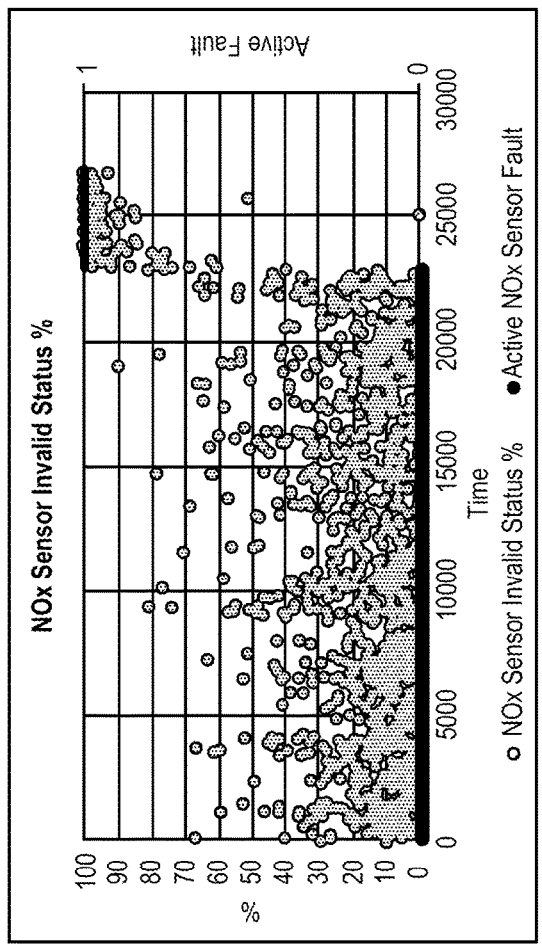
FIGS. 6A-C are graphs of example exceptional measurements of a $NO_x$ sensor.
Figure 6B:
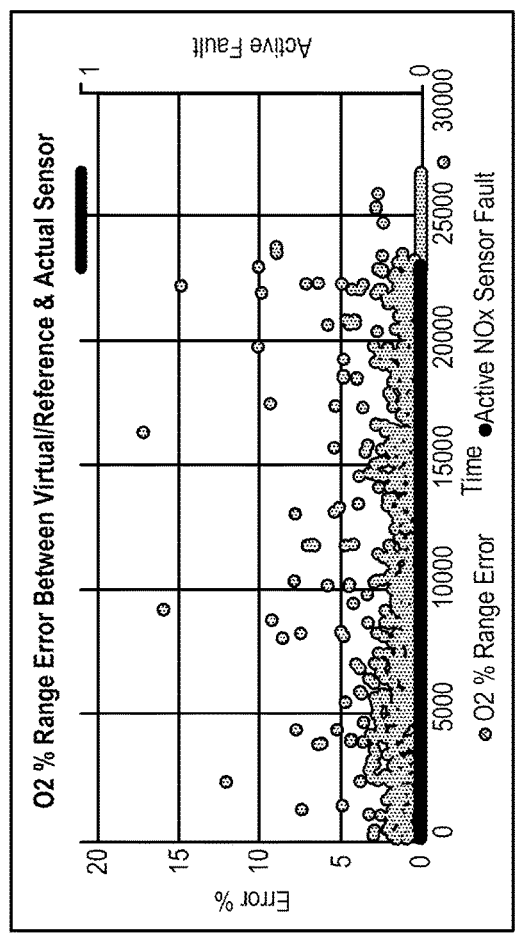
Figure 6C:
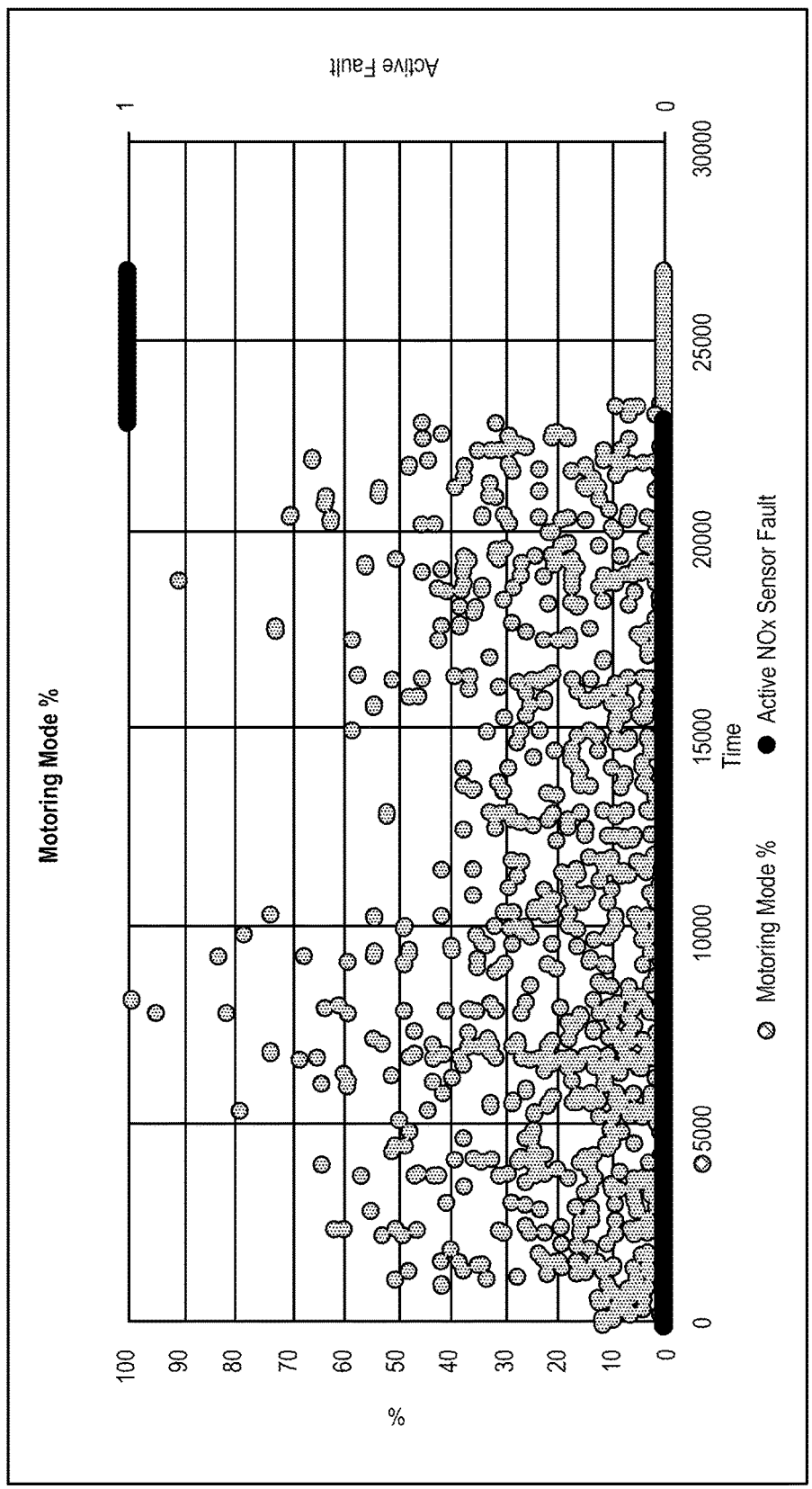

Referring now to FIGS. 6A-C, depicted are graphs 600A-C of example exceptional measurements of a $NO_x$ sensor. An unhealthy $NO_x$ sensor can be identified based on the presence of a corresponding active sensor fault code. The graphs 600A-C represent various features calculated from an unhealthy $NO_x$ sensor data having an active sensor fault code (e.g., similar features or sensor as graph 500A-C showing healthy $NO_x$ sensor data. Certain elements (e.g., types of data points) of graphs 600A-C can be similar to at least graphs 500A-C. For example, graph 600A shows $NO_x$ sensor invalid status percentage trend (e.g., compared to graph 500A) for an unhealthy sensor, graph 600B shows the deviation percentage between physical sensor measurement and virtual sensor measurement of O2 (e.g., compared to graph 500B), and graph 600C shows the motoring events percentage (e.g., compared to graph 500C). Further, graphs 600A-C include an active $NO_x$ sensor fault indicator to indicate a sensor fault (e.g., failure or error of the sensor). In various implementations, at least one of the graphs 600A-C can be described in conjunction with at least graph 800 indicating the offset data for presenting the remaining or exhibited useful life of the sensor.

As shown in graph 600A, the $NO_x$ sensor invalid status percentage over time may output exceptional responses during the motoring events (e.g., shown in conjunction with graph 600C). In this case, the aggregated invalid status may exceed 50% total occurrences over time, where the sensor failed at around 22500 hours total operating time. Each data point can represent an amalgamation of data during each execution of the engine 108 and the sensor. Based on the failure mode of the $NO_x$ sensor, the one or more features can be used to develop or train the model to predict that failure based on underlying physics, for example.

Further, as shown in graph 600B, during the motoring events of graph 600C, the deviation between measurements from the physical sensor and the virtual sensor increases over time (e.g., from 0 to 20000 hours). For example, the exceptional deviations at least at around 2500 hours, 9000 hours, and 16500 hours of operating time correspond to error percentages of around 12.5%, 16%, and 17.5%, respectively. The server 204 is configured to compare the deviation to a threshold. If the threshold is configured as 15%, the deviation results at least at 9000 hours and 16500 hours of operating time can be used to determine the exhibited useful life of the sensor. For example, based on the operating time and the various operating condition or environments (e.g., historical data) of the internal combustion engine system exposed to the sensor during the operating time, the server 204 can determine the exhibited useful life of the sensor. At 16500 hours of operation, the server 204 can determine an exhibited useful life to be around half of the exhibited useful life of the sensor at 9000 hours of operation, considering the similar deviation percentage and the operating time. In this example, the exhibited useful time at 16500 may be around 6000 hours with a trained model. In another example, if at 16500 hours of operation, the deviation percentage is around 20%, the server 204 can determine another exhibited useful life that is lower than when the deviation percentage is 16%, such as around 4000 hours, 4800 hours, 5000 hours, etc, depending on the various operation condition exposed to the sensor. An example of the model accuracy associated with the predicted or determined exhibited useful life (e.g., remaining time) of the sensor can be shown in conjunction with at least FIG. 7. Additional or alternative operations for determining the remaining useful life of the sensor can be described herein, such as in FIG. 10.

Figure 7:
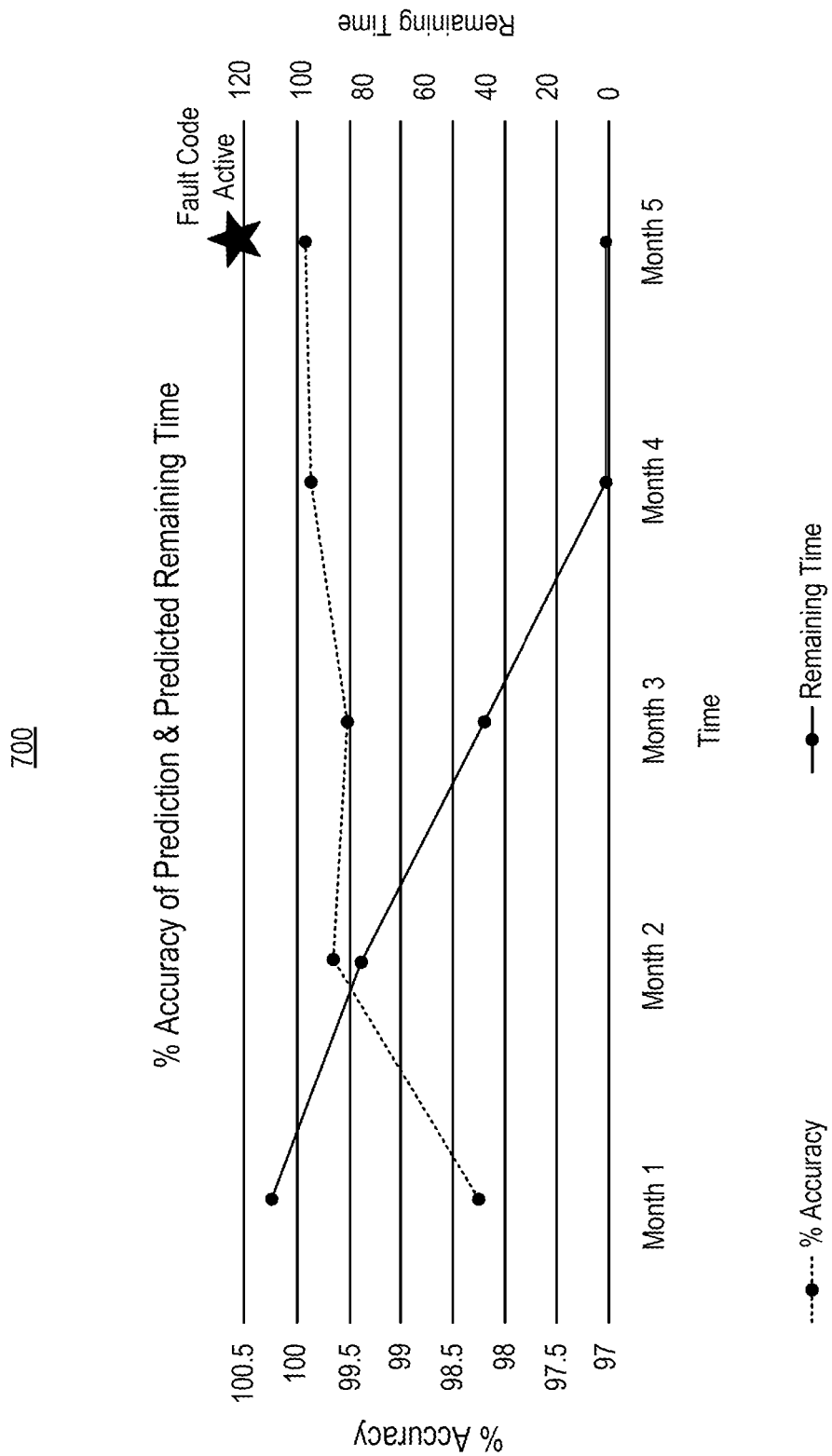
FIG. 7 is a graph of example prediction accuracy and remaining time of a $NO_x$ sensor.

Referring to FIG. 7, depicted is a graph 700 of example prediction accuracy and remaining time of a $NO_x$ sensor (e.g., or other components of the engine system). The operations associated with or used to generate the graph 700 can be executed, performed, or otherwise carried out by one or more components of the network system 100 (e.g., the monitoring system 104, etc.), server 204, network, data processing system, cloud computing environment, or any other computing devices described herein in conjunction with FIGS. 1-3. The graph 700 illustrates the predicted remaining operational time of the sensor and the associated prediction accuracy over time. In this case, the time in the x-axis includes the respective months of predictions. The left y-axis includes the percentage of prediction accuracy. The right y-axis includes the predicted remaining time (e.g., operational time) of the sensor, such as the remaining days of operation.

For example, the server 204 collects or monitors data relevant to the sensor. Using the model (or models), the server 204 determines or predicts the remaining operational time of the sensor. Associated with each prediction of the remaining time, the server 204 determines (e.g., as part of the model output) the percentage accuracy of the prediction, such as based on the similarities of the monitored data compared to other comparable engine systems having a similar sensor. In some cases, the server 204 determines the percentage accuracy based on the amount of data collected from the sensor, such that more sensor data can lead to a more accurate prediction, for example. In various implementations, the server 204 determines the percentage accuracy using the following formula: percentage accuracy=100−abs[(ECM run time at actual failure−ECM run time at predicted failure)*100/ECM run time at actual failure]. As shown, after predicting the failure in month 4, the fault code of the sensor becomes active in the subsequent month.

Figure 8:
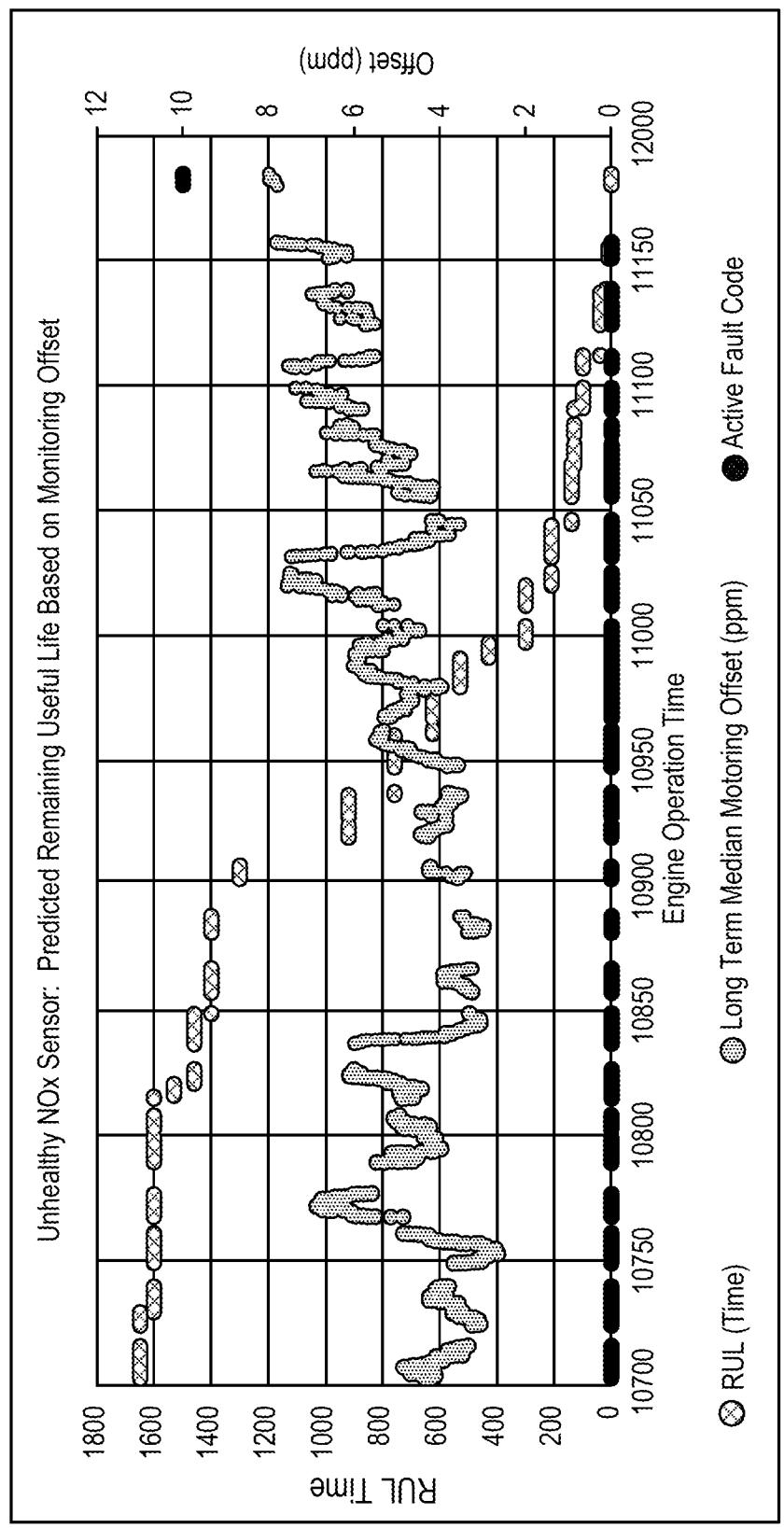
FIG. 8 is a graph of an example remaining life of a $NO_x$ sensor based on monitoring offset.

FIG. 8 is a graph 800 of an example remaining life (e.g., remaining or exhibited useful life) of a $NO_x$ sensor based on monitoring offset. The operations associated with or used to generate the graph 800 can be executed, performed, or otherwise carried out by one or more components of the network system 100 (e.g., the monitoring system 104, etc.), server 204, network, data processing system, cloud computing environment, or any other computing devices described herein in conjunction with FIGS. 1-3. The graph 800 can be generated by the server 204, for instance, using data from a failed $NO_x$ sensor. In this case, when the data from the sensor are processed, the server 204 (e.g., using the model) performs the prediction on the health status or remaining useful life of the sensor.

The graph 800 shows an x-axis including the operation time of the engine (e.g., in hours or other time instances). The graph 800 shows the remaining useful life (RUL) time (e.g., in hours) predicted over time associated with the left y-axis. The graph 800 shows the offset (e.g., in ppm) of the sensor over time associated with the right y-axis. The data points of the graph 800 are associated with at least one of the output from the model, the monitored data from the sensor (or other components), or the signal from the ECM indicating an active or inactive fault code.

For example, the graph 800 illustrates an example of heater degradation (e.g. thermal degradation on the heater element of the sensor). For purposes of providing examples, the failed sensor associated with the sensor data can be mounted on the engine outlet side (e.g., located downstream from the engine), the engine system includes an on-highway heavy-duty diesel engine, and operates an average of around 10 hours per day. As shown, the offset of the sensor during the motoring event(s) can increase over time, as the predicted remaining useful life of the sensor decreases over time. At around 11,180 hours of the engine operation time, the fault code is activated. The server 204 predicts the failure of the sensor prior to the fault code being triggered. In this case, the server 204 predicts the sensor failure at around 11,150 of operation time (e.g., indicating less than 30 hours remaining useful life of the sensor), for example.

Figure 9:
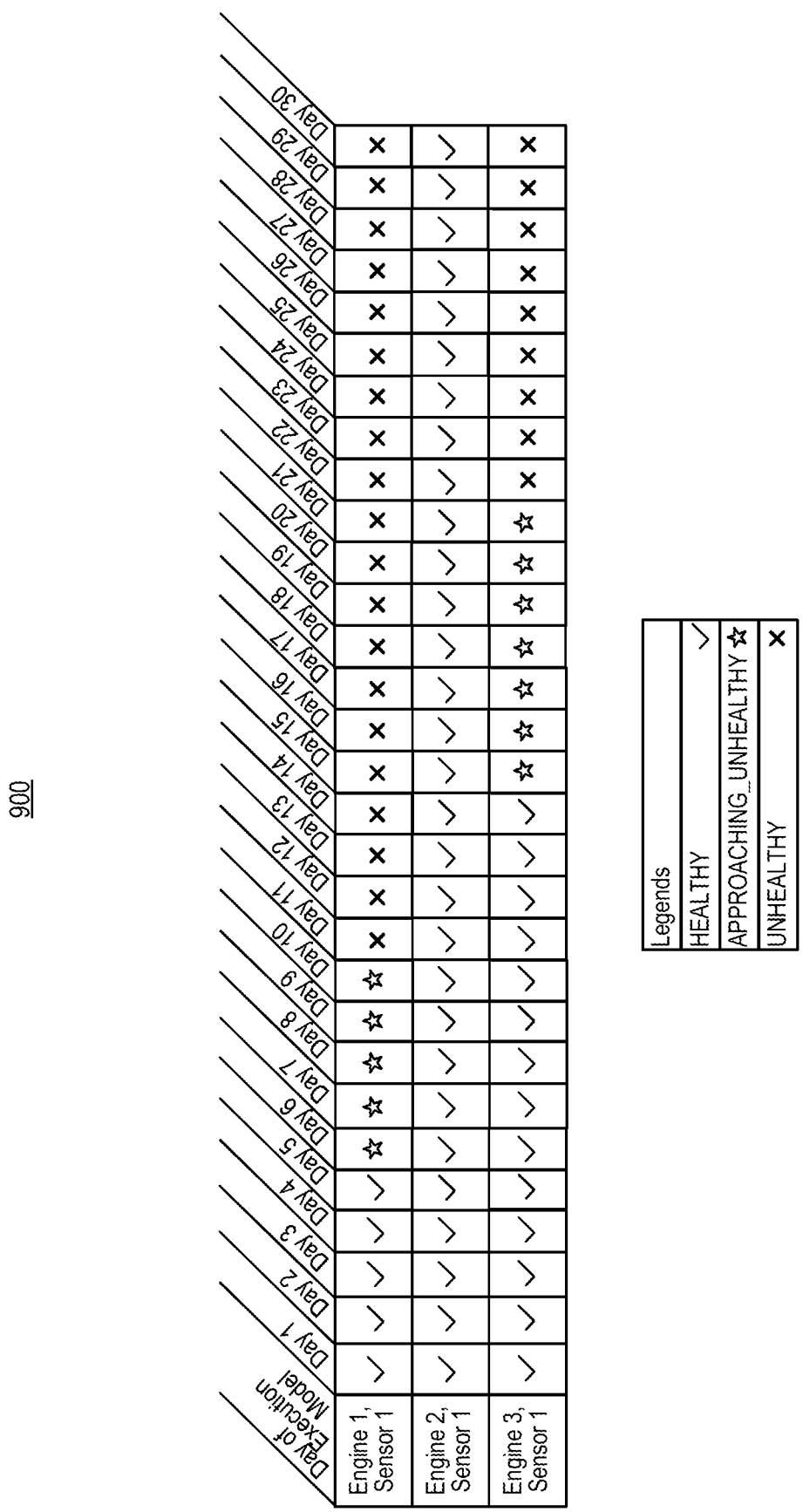
FIG. 9 is a heatmap of example health of $NO_x$ sensors associated with different systems.

Referring to FIG. 9, depicted is a heatmap 900 of example health of $NO_x$ sensors associated with different systems. The heatmap 900 includes a similar sensor associated with different engine systems (e.g., shown as engine 1, engine 2, and engine 3). The operations associated with or used to generate the heatmap 800 can be executed, performed, or otherwise carried out by one or more components of the network system 100 (e.g., the monitoring system 104, etc.), server 204, network, data processing system, cloud computing environment, or any other computing devices described herein in conjunction with FIGS. 1-3.

For example, the server 204 (or other servers or data processing systems) is configured to determine the health of the sensor by executing the model (or models). The server 204 determines or predicts the sensor health for one or more engine systems, such as for engine 1, engine 2, or engine 3. The sensor health may correspond to the remaining useful life of the sensor, which can be one of the various forms of outputs generated from the model. For example, the remaining useful life represents a degradation of the sensor health over time. When the sensor health is predicted for different engine systems, based on at least one of the model predicted remaining useful life or a preference/configuration on the advance notification (e.g., 30 days, 60 days, 90 days, etc., configured by the user), the server 204 (or the model) generates the heat map 900 showing status of the respective sensor health as at least one of "healthy," "approaching unhealthy," or "unhealthy." Based on the sensor health, the server 204 is configured to recommend or indicate an action (e.g., maintenance or service action) to perform for the sensor (among other components associated with the monitored data). The action includes at least one of repair of the sensor, sensor replacement, or other actions to avoid failure of the sensor. In various implementations, the server 204 may provide email notifications or integrate with a portal (e.g., accessible for the user via authentication credentials) for displaying the prediction of the sensor to the user, thereby consuming the output of the model.

Figure 10:
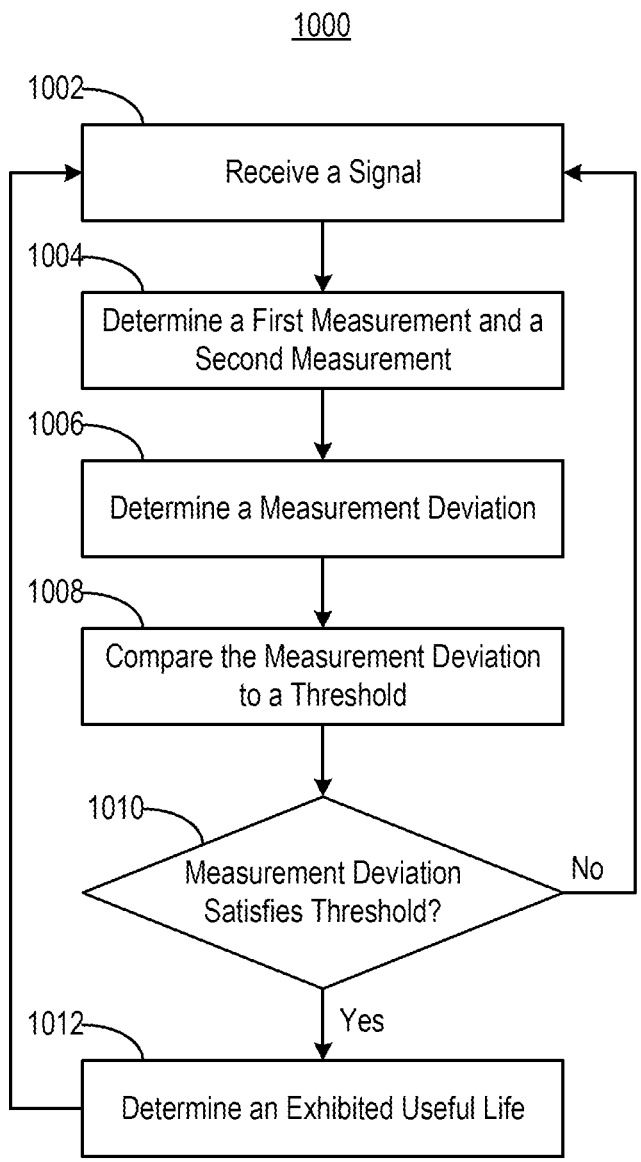
FIG. 10 is a flow diagram of an example method for monitored systems.

Referring now to FIG. 10, depicted is a flow diagram of an example method 1000 for physics inferred prognostics approach to component health prediction. The example method 1000 can be executed, performed, or otherwise carried out by one or more components of the network system 100 (e.g., the monitoring system 104, etc.), server 204, network, data processing system, cloud computing environment, or any other computing devices described herein in conjunction with FIGS. 1-3. The method 1000 includes receiving a signal, at step 1002. At step 1004, the method 1000 includes determining a first measurement and a second measurement. At step 1006, the method 1000 includes determining a measurement deviation. At step 1008, the method 1000 includes comparing the measurement deviation to a threshold. At step 1010, the method 1000 includes determining whether the measurement satisfies the threshold. At step 1012, the method 1000 includes determining an exhibited useful life.

Still referring to FIG. 10 in further detail, at step 1002, the server is configured to receive a signal from a monitored system (e.g., monitored system 102 or one or more component(s) of the network system 100 monitoring at least the sensor and the engine). The server includes at least one processor coupled at least one memory storing instructions that, when executed by the processor, cause the server (or the model executed by the server) to perform the operations discussed herein. The operations performed by the server can include, correspond to, or be a part of the execution of the model. The monitored system includes at least an internal combustion engine (e.g., engine 108), a sensor (e.g., $NO_x$ sensor), and an engine control unit (e.g., monitored system 102). The monitored system can be a part of a vehicle, for example. The engine control unit is configured to control or monitor the operation of the engine, such as engine events, operating status, etc. The engine control unit can include at least one engine sensor for identifying certain engine events (e.g., motoring events). In some cases, the engine control unit may perform similar features as a telematics unit, such as collecting information associated with at least the engine and the sensor and forwarding the information to the server for processing.

The server can receive signal(s) (e.g., a first signal) from the first monitored system periodically or continuously. For example, the server can receive a signal at predetermined time instances, such as hourly, daily, weekly, etc. In another example, the server can receive signals continuously in response to motoring new activities by the sensor or the engine sensor. Upon receiving the signal from the monitored system, the server obtains or identifies one or more occurrences of an internal combustion engine event (e.g., motoring events, sometimes referred to generally as an engine event) of the monitored system. For example, the server identifies a first occurrence of the internal combustion engine event and a second occurrence of the internal combustion engine event. Further, from the signal, the server identifies the measurement data of the sensor. The measurement data is indicative of or includes an amount of an exhaust byproduct associated with the monitored system, such as $NO_x$ measurement, O2 measurement, etc. In some cases, the measurement data is indicative of at least one of the sensor invalid status, sensor offset values, among other output or responses from the $NO_x$ sensor.

At step 1004, the server is configured to determine various measurements (e.g., $NO_x$ measurement or $NO_x$ sensor offset) from the measurement data based on or associated with respective occurrences of the engine event (e.g., during the motoring event). For example, the server determines a first measurement from the measurement data based on the first occurrence of the engine event. The server determines a second measurement from the measurement data based on the second occurrence of the engine event. The occurrences refer to different time instances when the engine is operating in the motoring mode (or other types of engine events configured by the administrator of the server). Herein, the first occurrence can occur at a time before the second occurrence, such that the server can identify the changes in the measurements from a first time (e.g., first occurrence) to a second time (e.g., second occurrence). The measurements of the occurrences can be plotted or mapped, such as shown at least in at least graph 304 of FIG. 3.

At step 1006, the server is configured to determine a measurement deviation (e.g., changes, increase, or decrease) between the first measurement and the second measurement of the respective occurrences of the engine event. The first measurement may increase, decrease, or remain around the same level as the second measurement during the motoring event. For example, the measurements can represent the sensor offset, because, during the motoring event, no $NO_x$ is produced from the engine. Hence, the measurement from the sensor during these motoring events corresponds to the offset values applied or calibrated for the sensor over its lifetime. For example, the sensor may be more or less sensitive throughout the course of its operation, such as due to progressive degradation. Certain calibration systems may apply an offset to the sensor to account for the changes in the sensitivity, such as for accuracy during the production of exhaust gas byproducts (e.g., for adjusting reductant dosage, hydrocarbon injection, etc.). Therefore, the changes in the sensor offset values throughout its lifespan can indicate at least the progression of degradation on the sensor, lost/gain in sensor sensitivity, and (e.g., by using a machine learning model discussed herein) the exhibited (e.g., remaining) useful life or failure time of the sensor.

At step 1008, the server is configured to compare the measurement deviation between the two measurements (e.g., or an aggregated measurement deviation between more than two measurements) to a (e.g., predetermined/stored threshold or determined threshold). The measurement threshold can be associated with the amount of exhaust byproduct. Comparing the deviation to the threshold can indicate whether the changes from the first measurement at the first occurrence to the second measurement at the second occurrence are greater than or less than the expected rate of change, the predetermined error percentage (e.g., for a certain operating time of the sensor), or other error ranges configured for the sensor. In some cases, the server can select the measurement threshold based on the exhaust byproduct, such as how much exposure (or operating time) the sensor incurred from the various operating condition of the vehicle system.

In various implementations, the server is configured to determine a reference measurement from the measurement data. The reference measurement can be used as a reference measurement for at least one of the first or the second measurements. The reference measurement can be a measurement from a virtual sensor (e.g., $NO_x$ virtual sensor), classified differently from the physical sensor measurement as part of the measurement data. The reference measurement can be associated with at least one of the first occurrence or the second occurrence of the engine event.

The server is configured to determine a first reference deviation between the first measurement and the reference measurement, and a second reference deviation between the second measurement and the reference measurement (or a different reference measurement). The server can compare the first and second reference deviations to their respective reference thresholds (e.g., stored first and second reference thresholds). The reference threshold(s) can represent a maximum or minimum allowable deviation between the first or second measurements and the reference measurement. By comparing the deviation to the reference threshold, the server can confirm that the first measurement or the second measurement is within the expected error percentage of the reference measurement during the respective occurrences. In certain aspects, at least one of the first reference threshold or the second reference threshold can be similar or equal to the measurement threshold.

In some cases, the server only determines the measurement deviation between the first measurement and the second measurement after or subsequent to determining that the reference deviation(s) are less than the reference threshold (e.g., within the expected range). For instance, the server is configured to determine the measurement deviation after determining that the first and second reference deviations are less than the first and second reference thresholds, respectively. In this case, because the measurement over time is within the threshold (e.g., the first and second measurements being within the reference error range), the server can be configured to use a predetermined exhibited useful life that is based on at least the operating time and current level of measurement/offsets of the sensor. The determination of the exhibited useful life can be performed after a comparison of the deviation between the measurements and the measurement threshold.

In other cases, the measurement(s) may exceed the reference threshold. By exceeding the reference threshold, the server determines that the measurement includes an exceptional response or offset values during the motoring event. In this case, using the model, the server determines the exhibited useful life based on various operating conditions of the vehicle system exposed to the sensor over time. These operating conditions include at least the amount of deviation, a total operating time of the sensor, manufacturer specification associated with the sensor, among other historical data of the sensor to determine the exhibited useful life.

In some implementations, the server is configured to determine the first measurement discussed herein by applying a first offset to a first data point of the measurement data. Further, the server is configured to determine the second measurement by applying a second offset to a second data point of the measurement data. For example, the sensor measurements reflect the offset value during the engine event. The server can obtain the sensor offset as the measurement, such as the first offset as the first measurement and the second offset as the second measurement.

In some implementations, the first signal is associated with the operation data of the monitored system. The operation data indicates any engine event (e.g., motoring events) that occurred during the operation of the engine over time. The server is configured to determine a target operating characteristic associated with various measurements (e.g., a subset of measurements) of the measurement data. For example, the target operating characteristic can correspond to the expected characteristic, behavior, or features of the data points during the motoring events. The server determines an exhibited operating characteristic based on the operation data and the measurement(s) (e.g., the first or second measurements). The exhibited operating characteristic can correspond to the actual characteristic, behavior, or features of the data points during the motoring events. The server can determine a target deviation (e.g., differences) between the target operating characteristic and the exhibited operating characteristic. The server compares the target deviation to a stored target threshold.

As such, if the server determines that the target deviation is less than or within the target threshold (e.g., data point features are within expectation), the server can then compare the measurement deviation to the measurement threshold. Otherwise, the server may remove at least one of the first measurement or the second measurement from the comparison after determining that the target deviation is greater than or equal to (e.g., outside the range of) the target threshold. In this case, the server is configured to remove outlier measurements to avoid or minimize inaccuracy in predicting the remaining useful life. In some cases, the server is configured to replace at least one of the first measurement or second measurement having features outside the target threshold with a third measurement, a fourth measurement, etc., associated with the respective occurrences of the engine events.

At step 1010, the server is configured to determine whether the measurement deviation satisfies the measurement threshold. For example, the measurement threshold can indicate at least a maximum rate of change of the offset values based on at least the time instances of the occurrences and the level of offset of the first and second measurements. The measurement deviation satisfying the measurement threshold can refer to the deviation being greater than or equal to the measurement threshold (e.g., if the threshold is the maximum). In this case, satisfying the threshold can indicate that the rate of change is higher than expected, indicating degradation or deactivation of the sensor. In certain aspects, satisfying the measurement threshold can refer to the measurement deviation being less than the threshold.

At step 1012, the server is configured to determine, after determining that the measurement deviation satisfies the measurement threshold, an exhibited useful life (e.g., a first exhibited useful life, remaining operating time, failure time, or predicted lifetime) of the sensor based on the measurement deviation and at least one of the first measurement or the second measurement (e.g., whichever occurred at a later time instance). The server can execute a model trained using data from failed sensors of various systems having an internal combustion engine, such as described above. The server determines the exhibited useful life of the sensor based on the trend of the changes in the sensor offset over time. Because the deviation or the rate of change from the first and second measurements satisfies the threshold, this can indicate the progression of or the rate of degradation of the sensor health/condition.

For example, if the server determines that the deviation from the first measurement to the second measurement is within the threshold (e.g., within expected progressive degradation), and the current measurement (or measurement at the latest occurrence) is beyond a stored threshold indicating that the degradation is beyond a certain point, the server can determine the exhibited useful life based on a predetermined exhibited useful life. For example, the predetermined exhibited useful life is based on at least the current measurement (e.g., current offset value) and the operating time. Otherwise, if the deviation is outside the threshold (e.g., not within expected progressive degradation), the server executing a trained machine learning model is configured to determine the exhibited useful life based on at least the operating time, the current offset value, historical operating conditions of the vehicle systems exposed to the sensor, among other variables.

In response to determining the exhibited useful life, the server is configured to transmit a signal (e.g., a response signal) to the monitored system (e.g., the monitored system 102) to notify the operator of the exhibited useful life. The notification can be provided via a display device, audio device, among other user interfaces. The server is configured to send the notification signal based on a comparison of the exhibited useful life to an exhibited useful life threshold. For instance, the server may send this notification signal if the exhibited useful life is less than the exhibited useful life threshold, indicating that the remaining life of the sensor should be warned to the operator (or other entities). In some cases, the server may not provide the exhibited useful life based on the exhibited useful life greater than a predetermined life threshold, such as 3 years, 5 years, 10 years, etc. Instead, the server is configured to send a signal to the monitored system (e.g., the monitored system 102) to notify the operator that the sensor is healthy.

In certain implementations, the first signal is further associated with or include a third occurrence of the internal combustion engine event of the monitored system. The first, second, and third measurements can be used to determine the rate of change of the sensor offsets. For example, during the third occurrence, the server can determine a third measurement from the first measurement data based on the third occurrence of the engine event. Subsequent to this determination, the server determines a rate of change (e.g., an aggregated rate of change, such as an average, mean, median, etc.) between the first, second, and third measurements. The server compares the rate of change to a stored rate threshold. The server can determine the rate threshold based on the changes in the sensor offsets trend analyzed from various failed sensors, for example. After determining that the rate of change satisfies (e.g., greater than or equal to) the rate threshold, the server determines a second exhibited useful life of the sensor based on the rate of change and at least one of the first to third measurements (e.g., most recent measurement(s)). As such, in this case, the server is configured to monitor the trend (e.g., changes) of the sensor offsets over time to determine whether the increase or decrease in the offsets is exceptional to determine the exhibited useful life (e.g., second exhibited useful life).

Further from the above example(s), and in some implementations, after receiving the first signal, the server is configured to determine a threshold deviation between a first operation measurement associated with the first occurrence and a second operation measurement associated with the second occurrence. The first and second operation measurements can be similar to reference measurements. For example, the operation measurement can include measurement from the virtual sensor based on the operating condition of the vehicle system at the various occurrences of the engine event. The server compares the measurement deviation to the threshold deviation. The server is configured to determine whether the measurement deviation satisfies the threshold deviation, such as within the error range of the threshold deviation. The server may only determine the first exhibited useful life only after determining that the measurement deviation satisfied (e.g., within the range) the threshold deviation. Otherwise, the server may not determine the first exhibited useful life. For instance, the server can remove outlier data points that are not within the error range of the virtual sensor measurement.

In some implementations, the server is configured to compare the first exhibited useful life to a stored exhibited useful life threshold. The exhibited useful life threshold indicates whether the exhibited useful life indicates an unhealthy or healthy sensor. Based on the exhibited useful life satisfying this threshold, the server compares the first measurement data to second measurement data associated with a second monitored system (or any other monitored system provided measurement data of failed sensors). The server can determine a failure mode of the sensor (e.g., the first sensor) based on at least the exhibited useful life, the first measurement data, and the second measurement data. For example, the server can compare the trend of data points between the first measurement data to the second measurement data associated with one or more types of failure. The server can repeat this process with other measurement data associated with other types of failures. Based on the detection of similarities between the measurement data, the server is configured to determine the failure mode including at least one of a degradation of a heater of the first monitored system, a platinum peel-off event of the first sensor, or a poisoning of the first sensor, among others.

In certain aspects, the server is configured to receive a second signal from the monitored system. The second signal is associated with an indication of a replacement of the first sensor with a second sensor. For example, when the first sensor is replaced with the second sensor, the monitored system may be triggered to send an indication to the server of the replaced sensor. In some cases, the server identifies the replacement of the first sensor based on the operating time of the second sensor (e.g., different operating time or reduced operating time). Further, the server may receive another signal (e.g., third signal) from the monitored system. The third signal is associated with or include second measurement data of the second sensor. Accordingly, the server may discard, transfer, or reset the historical data of the first sensor and proceed to collect, analyze, and process the second measurement data from the second sensor.

In various implementations, the server may receive a second signal from a second monitored system that comprises an internal combustion engine and a second sensor. The second signal is associated with or includes a third occurrence of a second internal combustion engine event of the second monitored system, a fourth occurrence of the second internal combustion engine event, and second measurement data of the second sensor. For example, from the second measurement data, the server is configured to determine at least a third measurement based on the third occurrence of the second engine event (e.g., similar to or different from the first engine event or the motoring event), a fourth measurement based on the fourth occurrence of the second engine event. Subsequently, the server determines a second measurement deviation between the third measurement and the fourth measurement. Then, the server compares the second measurement deviation to the stored measurement threshold, similar to step 1008. In this case, the server can determine, after determining that the second measurement deviation satisfies the measurement threshold, a second exhibited useful life of the second sensor based on the second measurement deviation and at least one of the third measurement or the fourth measurement. As such, the server can reiterate the operations, steps, or techniques discussed herein for other monitored systems to determine the condition of other sensors or components.

IV. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, exhaust gas, liquid reductant, gaseous reductant, aqueous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item unless specifically stated to the contrary.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W to P, etc.) herein are inclusive of their maximum values and minimum values (e.g., W to P includes W and includes P, etc.), unless otherwise indicated. Furthermore, a range of values (e.g., W to P, etc.) does not necessarily require the inclusion of intermediate values within the range of values (e.g., W to P can include only W and P, etc.), unless otherwise indicated.

What is claimed is:

1. At least one server, the at least one server comprising at least one processor coupled to at least one memory storing instructions that, when executed by the at least one processor, cause the at least one server to:
   receive a first signal from a first monitored system that comprises an internal combustion engine and a first sensor, the first signal associated with a first occurrence of an internal combustion engine event of the first monitored system, a second occurrence of the internal combustion engine event of the first monitored system, and first measurement data of the first sensor;
   determine a first measurement from the first measurement data based on the first occurrence of the internal combustion engine event;
   determine a second measurement from the first measurement data based on the second occurrence of the internal combustion engine event;
   determine a reference measurement from the first measurement data;
   determine a first reference deviation between the first measurement and the reference measurement;
   determine a second reference deviation between the second measurement and the reference measurement;
   compare the first reference deviation to a stored first reference threshold;
   compare the second reference deviation to a stored second reference threshold;
   after determining that the first reference deviation is less than the first reference threshold and the second reference deviation is less than the second reference threshold, determine a measurement deviation between the first measurement and the second measurement;
   compare the measurement deviation to a stored measurement threshold; and
   after determining that the measurement deviation satisfies the measurement threshold, determine a first exhibited useful life of the first sensor based on the measurement deviation and at least one of the first measurement or the second measurement.

2. The at least one server of claim 1, wherein the first reference threshold is equal to the measurement threshold.

3. The at least one server of claim 1, wherein the instructions, when executed by the at least one processor, further cause the at least one server to:
   determine the first measurement by applying a first offset to a first data point of the first measurement data; and
   determine the second measurement by applying a second offset to a second data point of the first measurement data.

4. The at least one server of claim 1, wherein:
the first signal is further associated with operation data of the first monitored system; and
the instructions, when executed by the at least one processor, further cause the at least one server to:
determine a target operating characteristic associated with the first measurement,
determine an exhibited operating characteristic based on the operation data and the first measurement,
determine a target deviation between the target operating characteristic and the exhibited operating characteristic,
compare the target deviation to a stored target threshold, and
compare the measurement deviation to the measurement threshold after determining that the target deviation is less than the target threshold.

5. The at least one server of claim 1, wherein the instructions, when executed by the at least one processor, further cause the at least one server to receive a second signal from the first monitored system, the second signal associated with an indication of a replacement of the first sensor with a second sensor.

6. The at least one server of claim 5, wherein the instructions, when executed by the at least one processor, further cause the at least one server to receive a third signal from the first monitored system, the third signal associated with second measurement data of the second sensor of the first monitored system.

7. The at least one server of claim 1, wherein:
the first signal is further associated with a third occurrence of the internal combustion engine event of the first monitored system; and
the instructions, when executed by the at least one processor, further cause the at least one server to:
determine a third measurement from the first measurement data based on the third occurrence of the internal combustion engine event,
determine a rate of change between the first measurement, the second measurement, and the third measurement,
compare the rate of change to a stored rate threshold, and
after determining that the rate of change satisfies the rate threshold, determine a second exhibited useful life of the first sensor based on the rate of change and at least one of the first measurement, the second measurement, or the third measurement.

8. The at least one server of claim 7, wherein the instructions, when executed by the at least one processor, further cause the at least one server to:
determine a threshold deviation between a first operation measurement associated with the first occurrence of the internal combustion engine event and a second operation measurement associated with the second occurrence of the internal combustion engine event after receiving the first signal;
compare the measurement deviation to the threshold deviation; and
determine the first exhibited useful life after determining that the measurement deviation satisfies the threshold deviation.

9. The at least one server of claim 1, wherein:
the first measurement data is indicative of an amount of an exhaust byproduct associated with the first monitored system;
the measurement threshold is associated with the exhaust byproduct; and
the instructions, when executed by the at least one processor, further cause the at least one server to select the measurement threshold based on the exhaust byproduct.

10. The at least one server of claim 1, wherein the instructions, when executed by the at least one processor, further cause the at least one server to:
compare the first exhibited useful life to a stored exhibited useful life threshold;
compare, based on the first exhibited useful life satisfying the exhibited useful life threshold, the first measurement data to second measurement data associated with a second monitored system; and
determine a failure mode of the first sensor based on the first exhibited useful life, the first measurement data, and the second measurement data, the failure mode comprising at least one of a degradation of a heater of the first monitored system, a platinum peel-off event of the first sensor, or a poisoning of the first sensor.

11. The at least one server of claim 1, wherein the instructions, when executed by the at least one processor, further cause the at least one server to:
compare the first exhibited useful life to a stored exhibited useful life threshold; and
transmit a second signal to the first monitored system, the second signal associated with a notification to replace the first sensor.

12. A network comprising:
a first monitored system comprising:
a first internal combustion engine,
a first sensor, and
a first engine control unit; and
at least one server external to the first monitored system, the at least one server comprising at least one processor coupled to at least one memory storing instructions that, when executed by the at least one processor, cause the at least one server to:
receive a first signal from the first engine control unit, the first signal associated with a first occurrence of a first internal combustion engine event of the first monitored system, a second occurrence of the first internal combustion engine event, and first measurement data of the first sensor;
determine a first measurement from the first measurement data based on the first occurrence of the first internal combustion engine event;
determine a second measurement from the first measurement data based on the second occurrence of the first internal combustion engine event;
determine a reference measurement from the first measurement data;
determine a first reference deviation between the first measurement and the reference measurement;
determine a second reference deviation between the second measurement and the reference measurement;
compare the first reference deviation to a stored first reference threshold;
compare the second reference deviation to a stored second reference threshold;
after determining that the first reference deviation is less than the first reference threshold and the second reference deviation is less than the second reference threshold, determine a first measurement deviation between the first measurement and the second measurement;

compare the first measurement deviation to a stored measurement threshold; and after determining that the first measurement deviation satisfies the measurement threshold, determine a first exhibited useful life of the first sensor based on the first measurement deviation and at least one of the first measurement or the second measurement.

13. The network of claim 12, further comprising a second monitored system comprising:

a second internal combustion engine, a second sensor, and a second engine control unit;

wherein the instructions, when executed by the at least one processor, further cause the at least one server to:

receive a second signal from the second engine control unit, the second signal associated with a third occurrence of a second internal combustion engine event of the second monitored system, a fourth occurrence of the second internal combustion engine event, and second measurement data of the second sensor;

determine a third measurement from the second measurement data based on the third occurrence of the second internal combustion engine event;

determine a fourth measurement from the second measurement data based on the fourth occurrence of the second internal combustion engine event;

determine a second measurement deviation between the third measurement and the fourth measurement;

compare the second measurement deviation to the stored measurement threshold; and after determining that the second measurement deviation satisfies the measurement threshold, determine a second exhibited useful life of the second sensor based on the second measurement deviation and at least one of the third measurement or the fourth measurement.

14. The network of claim 13, wherein the instructions, when executed by the at least one processor, further cause the at least one server to utilize the first exhibited useful life and the second exhibited useful life to determine an expected useful life associated with the first sensor and the second sensor.

15. At least one server, the at least one server comprising at least one processor coupled to at least one memory storing instructions that, when executed by the at least one processor, cause the at least one server to:

receive a first signal from a first monitored system that comprises an internal combustion engine and a first sensor, the first signal associated with a first occurrence of an internal combustion engine event of the first monitored system, operation data of the first monitored system, a second occurrence of the internal combustion engine event of the first monitored system, and first measurement data of the first sensor;

determine a first measurement from the first measurement data based on the first occurrence of the internal combustion engine event;

determine a second measurement from the first measurement data based on the second occurrence of the internal combustion engine event;

determine a measurement deviation between the first measurement and the second measurement;

determine a target operating characteristic associated with the first measurement;

determine an exhibited operating characteristic based on the operation data and the first measurement;

determine a target deviation between the target operating characteristic and the exhibited operating characteristic;

compare the target deviation to a stored target threshold;

compare the measurement deviation to a stored measurement threshold after determining that the target deviation is less than the target threshold; and after determining that the measurement deviation satisfies the measurement threshold, determine a first exhibited useful life of the first sensor based on the measurement deviation and at least one of the first measurement or the second measurement.

16. At least one server, the at least one server comprising at least one processor coupled to at least one memory storing instructions that, when executed by the at least one processor, cause the at least one server to:

receive a first signal from a first monitored system that comprises an internal combustion engine and a first sensor, the first signal associated with a first occurrence of an internal combustion engine event of the first monitored system, a second occurrence of the internal combustion engine event of the first monitored system, and first measurement data of the first sensor;

receive a second signal from the first monitored system, the second signal associated with an indication of a replacement of the first sensor with a second sensor;

determine a first measurement from the first measurement data based on the first occurrence of the internal combustion engine event;

determine a second measurement from the first measurement data based on the second occurrence of the internal combustion engine event;

determine a measurement deviation between the first measurement and the second measurement;

compare the measurement deviation to a stored measurement threshold; and after determining that the measurement deviation satisfies the measurement threshold, determine a first exhibited useful life of the first sensor based on the measurement deviation and at least one of the first measurement or the second measurement.

17. The at least one server of claim 16, wherein the instructions, when executed by the at least one processor, further cause the at least one server to receive a third signal from the first monitored system, the third signal associated with second measurement data of the second sensor of the first monitored system.

18. At least one server, the at least one server comprising at least one processor coupled to at least one memory storing instructions that, when executed by the at least one processor, cause the at least one server to:

receive a first signal from a first monitored system that comprises an internal combustion engine and a first sensor, the first signal associated with a first occurrence of an internal combustion engine event of the first monitored system, a second occurrence of the internal combustion engine event of the first monitored system, a third occurrence of the internal combustion engine event of the first monitored system, and first measurement data of the first sensor;

determine a first measurement from the first measurement data based on the first occurrence of the internal combustion engine event;

determine a second measurement from the first measurement data based on the second occurrence of the internal combustion engine event;
determine a third measurement from the first measurement data based on the third occurrence of the internal combustion engine event;
determine a rate of change between the first measurement, the second measurement, and the third measurement;
compare the rate of change to a stored rate threshold;
determine a threshold deviation between a first operation measurement associated with the first occurrence of the internal combustion engine event and a second operation measurement associated with the second occurrence of the internal combustion engine event after receiving the first signal;
determine a measurement deviation between the first measurement and the second measurement;
compare the measurement deviation to the threshold deviation; and
after determining that the measurement deviation satisfies the threshold deviation, determine a first exhibited useful life of the first sensor based on the measurement deviation and at least one of the first measurement or the second measurement; and
after determining that the rate of change satisfies the rate threshold, determine a second exhibited useful life of the first sensor based on the rate of change and at least one of the first measurement, the second measurement, or the third measurement.

19. At least one server, the at least one server comprising at least one processor coupled to at least one memory storing instructions that, when executed by the at least one processor, cause the at least one server to:
receive a first signal from a first monitored system that comprises an internal combustion engine and a first sensor, the first signal associated with a first occurrence of an internal combustion engine event of the first monitored system, a second occurrence of the internal combustion engine event of the first monitored system, and first measurement data of the first sensor, wherein the first measurement data is indicative of an amount of an exhaust byproduct associated with the first monitored system;
determine a first measurement from the first measurement data based on the first occurrence of the internal combustion engine event;
determine a second measurement from the first measurement data based on the second occurrence of the internal combustion engine event;
determine a measurement deviation between the first measurement and the second measurement;
compare the measurement deviation to a stored measurement threshold associated with the exhaust byproduct; and
after determining that the measurement deviation satisfies the measurement threshold, determine a first exhibited useful life of the first sensor based on the measurement deviation and at least one of the first measurement or the second measurement.

20. At least one server, the at least one server comprising at least one processor coupled to at least one memory storing instructions that, when executed by the at least one processor, cause the at least one server to:
receive a first signal from a first monitored system that comprises an internal combustion engine and a first sensor, the first signal associated with a first occurrence of an internal combustion engine event of the first monitored system, a second occurrence of the internal combustion engine event of the first monitored system, and first measurement data of the first sensor;
determine a first measurement from the first measurement data based on the first occurrence of the internal combustion engine event;
determine a second measurement from the first measurement data based on the second occurrence of the internal combustion engine event;
determine a measurement deviation between the first measurement and the second measurement;
compare the measurement deviation to a stored measurement threshold;
after determining that the measurement deviation satisfies the measurement threshold, determine a first exhibited useful life of the first sensor based on the measurement deviation and at least one of the first measurement or the second measurement;
compare the first exhibited useful life to a stored exhibited useful life threshold;
compare, based on the first exhibited useful life satisfying the exhibited useful life threshold, the first measurement data to second measurement data associated with a second monitored system; and
determine a failure mode of the first sensor based on the first exhibited useful life, the first measurement data, and the second measurement data, the failure mode comprising at least one of a degradation of a heater of the first monitored system, a platinum peel-off event of the first sensor, or a poisoning of the first sensor.

21. At least one server, the at least one server comprising at least one processor coupled to at least one memory storing instructions that, when executed by the at least one processor, cause the at least one server to:
receive a first signal from a first monitored system that comprises an internal combustion engine and a first sensor, the first signal associated with a first occurrence of an internal combustion engine event of the first monitored system, a second occurrence of the internal combustion engine event of the first monitored system, and first measurement data of the first sensor;
determine a first measurement from the first measurement data based on the first occurrence of the internal combustion engine event;
determine a second measurement from the first measurement data based on the second occurrence of the internal combustion engine event;
determine a measurement deviation between the first measurement and the second measurement;
compare the measurement deviation to a stored measurement threshold;
after determining that the measurement deviation satisfies the measurement threshold, determine a first exhibited useful life of the first sensor based on the measurement deviation and at least one of the first measurement or the second measurement; and
compare the first exhibited useful life to a stored exhibited useful life threshold; and
transmit a second signal to the first monitored system, the second signal associated with a notification to replace the first sensor.

* * * * *